United States Patent
Sasaki et al.

(10) Patent No.: US 7,911,883 B2
(45) Date of Patent: Mar. 22, 2011

(54) NEAR-FIELD LIGHT GENERATING ELEMENT HAVING TWO DIFFERENT ANGLES

(75) Inventors: Yoshitaka Sasaki, Milpitas, CA (US);
Hiroyuki Ito, Milpitas, CA (US);
Shigeki Tanemura, Milpitas, CA (US);
Hironori Araki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 28 days.

(21) Appl. No.: 12/457,984

(22) Filed: Jun. 26, 2009

(65) Prior Publication Data

US 2010/0328806 A1    Dec. 30, 2010

(51) Int. Cl.
*G11B 11/00* (2006.01)
(52) U.S. Cl. ............ 369/13.33; 369/13.13; 360/59
(58) Field of Classification Search ............ 360/59;
369/13.33, 13.13, 13.32, 13.17, 112.09, 112.14,
369/112.21, 112.27; 385/129, 31, 88–94;
250/201.3
See application file for complete search history.

(56) References Cited

U.S. PATENT DOCUMENTS

| | | | |
|---|---|---|---|
| 6,649,894 B2 | 11/2003 | Matsumoto et al. | |
| 7,547,868 B2 * | 6/2009 | Hongo et al. | 369/112.27 |
| 2006/0233062 A1 | 10/2006 | Bedillion et al. | |
| 2007/0165494 A1 | 7/2007 | Cho et al. | |
| 2008/0002298 A1 | 1/2008 | Sluzewski | |
| 2008/0055762 A1 | 3/2008 | Shimazawa et al. | |
| 2010/0073802 A1 * | 3/2010 | Komura et al. | 360/59 |
| 2010/0079895 A1 * | 4/2010 | Takayama et al. | 360/59 |
| 2010/0157746 A1 * | 6/2010 | Hongo | 369/13.24 |
| 2010/0208378 A1 * | 8/2010 | Seigler et al. | 360/59 |

FOREIGN PATENT DOCUMENTS

| | | |
|---|---|---|
| JP | A-2003-114184 | 4/2003 |
| JP | A-2005-4901 | 1/2005 |
| JP | A-2007-257753 | 10/2007 |
| JP | A-2008-016096 | 1/2008 |

OTHER PUBLICATIONS

U.S. Appl. No. 12/814,669, filed Jun. 14, 2010.

(Continued)

*Primary Examiner* — Tan X Dinh
(74) *Attorney, Agent, or Firm* — Oliff & Berridge, PLC

(57) ABSTRACT

A near-field light generating element accommodated in a groove of an encasing layer has an outer surface that includes a first end face including a near-field light generating part, a second end face opposite to the first end face, and a coupling portion that couples the first and second end faces. The coupling portion includes a top surface, and first and second side surfaces that decrease in distance from each other with increasing distance from the top surface. The first end face includes a first side located at an end of the first side surface, and a second side located at an end of the second side surface. Each of the first and second sides includes an upper part and a lower part continuous with each other. An angle formed between the respective lower parts of the first and second sides is smaller than that formed between the respective upper parts of the first and second sides.

16 Claims, 21 Drawing Sheets

OTHER PUBLICATIONS

Challener W.A., et al. "Heat-Assisted Magnetic Recording by a Near-Field Transducer with Efficient Optical Energy Transfer," Nature Photonics, Mar. 2009, pp. 1-5, Seagate Technology, Pittsburgh, PA.
Yoshitaka Sasaki et al., U.S. Appl. No. 12/385,447, filed Apr. 8, 2009.
Yoshitaka Sasaki et al., U.S. Appl. No. 12/458,546, filed Jul. 15, 2009.
Yoshitaka Sasaki et al., U.S. Appl. No. 12/585,150, filed Sep. 4, 2009.
Yoshitaka Sasaki et al., U.S. Appl. No. 12/714,998, filed Mar. 1, 2010.
Yoshitaka Sasaki et al., U.S. Appl. No. 12/727,666, filed Mar. 19, 2010.
Yoshitaka Sasaki et al., U.S. Appl. No. 12/727,620, filed Mar. 19, 2010.

\* cited by examiner

NEAR-FIELD LIGHT GENERATING ELEMENT HAVING TWO DIFFERENT ANGLES

BACKGROUND OF THE INVENTION

1. Field of the Invention

The present invention relates to a near-field light generating device and a method of manufacturing the same, the device being intended for use in heat-assisted magnetic recording where a recording medium is irradiated with near-field light to lower the coercivity of the recording medium for data recording, and to a heat-assisted magnetic recording head that includes the near-field light generating device.

2. Description of the Related Art

Recently, magnetic recording devices such as a magnetic disk drive have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a reproducing head including a magnetoresistive element (hereinafter, also referred to as MR element) for reading and a recording head including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data recording with existing magnetic heads.

To solve the foregoing problems, there has been proposed a method so-called heat-assisted magnetic recording. This method uses a recording medium having high coercivity. When recording data, a magnetic field and heat are simultaneously applied to the area of the recording medium where to record data, so that the area rises in temperature and drops in coercivity for data recording. The area where data is recorded subsequently falls in temperature and rises in coercivity to increase the thermal stability of magnetization.

In heat-assisted magnetic recording, near-field light is typically used as a means for applying heat to the recording medium. A known method for generating near-field light is to irradiate a plasmon antenna, which is a small piece of metal, with laser light. The plasmon antenna has a near-field light generating part which is a sharp-pointed part for generating near-field light. The laser light applied to the plasmon antenna excites surface plasmons on the plasmon antenna. The surface plasmons propagate to the near-field light generating part of the plasmon antenna, and the near-field light generating part generates near-field light based on the surface plasmons. The near-field light generated by the plasmon antenna exists only within an area smaller than the diffraction limit of light. Irradiating the recording medium with this near-field light makes it possible to heat only a small area of the recording medium.

There has been known a triangular plasmon antenna such as one described in JP 2005-4901 A. JP 2007-257753 A describes a micro optical recording head that has a plasmon probe (plasmon antenna) of triangular-prism shape embedded in its core, and a method of manufacturing the same. According to this manufacturing method, a V-shaped groove is formed in a first core layer, and then a metal film is formed on the first core layer. The metal film is then removed from the areas other than the groove by polishing so that the first core layer and the metal film are flattened at the top. A second core layer is then formed over the first core layer and the metal film.

In order to increase the recording density of the magnetic recording device, the near-field light preferably has a smaller spot diameter. To generate near-field light that has a small spot diameter and sufficient intensity, it is effective to form the near-field light generating part of the plasmon antenna into a more sharply pointed shape and to concentrate more surface plasmons at such a near-field light generating part. When actually fabricating a plasmon antenna, however, there has conventionally been the problem that the near-field light generating part becomes roundish, so that it has been difficult to concentrate a lot of surface plasmons at a near-field light generating part of pointed shape.

OBJECT AND SUMMARY OF THE INVENTION

It is an object of the present invention to provide a near-field light generating device capable of concentrating a lot of surface plasmons at a near-field light generating part of pointed shape, a method of manufacturing the same, and a heat-assisted magnetic recording head that includes the near-field light generating device.

A first near-field light generating device according to the present invention includes: an encasing layer having a top surface and a groove that opens in the top surface; and a near-field light generating element that is accommodated in the groove and has a near-field light generating part, a surface plasmon being excited based on light and propagating to the near-field light generating part, the near-field light generating part generating near-field light based on the surface plasmon. The groove has a first sidewall and a second sidewall that decrease in distance from each other with increasing distance from the top surface of the encasing layer. The near-field light generating element has an outer surface, the outer surface including: a first end face that includes the near-field light generating part; a second end face opposite to the first end face; and a coupling portion that couples the first end face and the second end face to each other. A length of the near-field light generating element in a direction perpendicular to the first end face is greater than a length of the first end face in a direction perpendicular to the top surface of the encasing layer.

The coupling portion includes a top surface, a first side surface that is opposed to the first sidewall, and a second side surface that is opposed to the second sidewall. The distance between the first side surface and the second side surface decreases with increasing distance from the top surface of the coupling portion. The first end face includes: a first side that is located at an end of the first side surface; a second side that is located at an end of the second side surface; a third side that is located at an end of the top surface of the coupling portion; and a pointed tip that is formed by contact of the first and second sides with each other and constitutes the near-field light generating part. Each of the first side and the second side includes an upper part and a lower part that are continuous with each other. An angle formed between the lower part of the first side and the lower part of the second side is smaller than that formed between the upper part of the first side and the upper part of the second side.

In the first near-field light generating device according to the present invention, the encasing layer may have an end face that is located in the same plane as the first end face. The first sidewall may include a first edge that lies in the end face, and the second sidewall may include a second edge that lies in the end face. In this case, each of the first edge and the second edge may include an upper part and a lower part that are continuous with each other. An angle formed between the lower part of the first edge and the lower part of the second edge may be smaller than that formed between the upper part of the first edge and the upper part of the second edge.

The first near-field light generating device according to the present invention may further include a dielectric film that is disposed between the first and second sidewalls and the first and second side surfaces.

The first near-field light generating device according to the present invention may further include a waveguide that allows propagation of light to be used for exciting a surface plasmon on the near-field light generating element. The waveguide may have an outer surface that includes an opposed portion opposed to a part of the coupling portion. In this case, the near-field light generating device may further include an interposition layer that has a refractive index lower than that of the waveguide and is interposed between the opposed portion and the near-field light generating element.

In the case where the first near-field light generating device of the invention includes the waveguide mentioned above, the top surface of the coupling portion may have a first border that is located at the top end of the first end face, a second border that is located at the top end of the second end face, a third border that is located at the top end of the first side surface, and a fourth border that is located at the top end of the second side surface. The third border and the fourth border may have their respective portions that decrease in distance from each other in a direction parallel to the first border with decreasing distance to the first border. A corner portion between the second border and the third border and a corner portion between the second border and the fourth border may both be rounded.

A method of manufacturing the first near-field light generating device according to the present invention includes the steps of forming a preliminary encasing layer that is intended to make the encasing layer when the groove is formed therein afterward; completing the encasing layer by forming the groove in the preliminary encasing layer by etching the preliminary encasing layer; and forming the near-field light generating element such that it is accommodated in the groove of the encasing layer.

In the method of manufacturing the first near-field light generating device according to the present invention, the encasing layer may have an end face that is located in the same plane as the first end face. The first sidewall may include a first edge that lies in the end face, and the second sidewall may include a second edge that lies in the end face. Each of the first edge and the second edge may include an upper part and a lower part that are continuous with each other. An angle formed between the lower part of the first edge and the lower part of the second edge may be smaller than that formed between the upper part of the first edge and the upper part of the second edge. In this case, the step of completing the encasing layer may include the steps of forming an initial groove in the preliminary encasing layer by taper-etching the preliminary encasing layer; and completing the groove by etching the initial groove.

The near-field light generating device manufactured by the manufacturing method for the first near-field light generating device according to the present invention may further include a dielectric film that is disposed between the first and second sidewalls and the first and second side surfaces. In this case, the method of manufacturing the near-field light generating device may further include the step of forming the dielectric film that is performed between the step of completing the encasing layer and the step of forming the near-field light generating element.

A first heat-assisted magnetic recording head according to the present invention includes: a medium facing surface that faces a recording medium; a magnetic pole; and the first near-field light generating device according to the invention. The magnetic pole has an end face located in the medium facing surface, and produces a recording magnetic field for recording data on the recording medium. The near-field light generating part is located in the medium facing surface. The near-field light generating device generates near-field light that is to be applied to the recording medium when data is recorded on the recording medium using the recording magnetic field. In addition to the encasing layer and the near-field light generating element, the near-field light generating device further has a waveguide that allows propagation of light to be used for exciting a surface plasmon on the near-field light generating element. The waveguide has an outer surface that includes an opposed portion opposed to a part of the coupling portion.

The first heat-assisted magnetic recording head according to the present invention may further include a substrate on which the magnetic pole and the near-field light generating device are stacked. In this case, the substrate may have a top surface that faces the magnetic pole and the near-field light generating device, and the near-field light generating device may be located farther from the top surface of the substrate than is the magnetic pole.

A second near-field light generating device according to the present invention includes: an encasing layer having a top surface and a groove that opens in the top surface; and a near-field light generating element that is accommodated in the groove and has a near-field light generating part, a surface plasmon being excited based on light and propagating to the near-field light generating part, the near-field light generating part generating near-field light based on the surface plasmon.

The groove has a first sidewall and a second sidewall that decrease in distance from each other with increasing distance from the top surface of the encasing layer. The near-field light generating element has an outer surface, the outer surface including: a first end face that includes the near-field light generating part; a second end face opposite to the first end face; and a coupling portion that couples the first end face and the second end face to each other. A length of the near-field light generating element in a direction perpendicular to the first end face is greater than a length of the first end face in a direction perpendicular to the top surface of the encasing layer.

The coupling portion includes a top surface, a first side surface that is opposed to the first sidewall, and a second side surface that is opposed to the second sidewall. The distance between the first side surface and the second side surface decreases with increasing distance from the top surface of the coupling portion. The first end face includes: a first side that is located at an end of the first side surface; a second side that is located at an end of the second side surface; a third side that is located at an end of the top surface of the coupling portion; and a pointed tip that is formed by contact of the first and second sides with each other and constitutes the near-field light generating part. The top surface of the coupling portion has a first border that is located at the top end of the first end face, a second border that is located at the top end of the second end face, a third border that is located at the top end of the first side surface, and a fourth border that is located at the top end of the second side surface. The third border and the fourth border have their respective portions that decrease in distance from each other in a direction parallel to the first border with decreasing distance to the first border. A corner portion between the second border and the third border and a corner portion between the second border and the fourth border are both rounded.

The second near-field light generating device according to the present invention may further include a waveguide that allows propagation of light to be used for exciting a surface plasmon on the near-field light generating element. The waveguide may have an outer surface that includes an opposed portion opposed to a part of the coupling portion. In this case, the near-field light generating device may further include an interposition layer that has a refractive index lower than that of the waveguide and is interposed between the opposed portion and the near-field light generating element.

A second heat-assisted magnetic recording head according to the present invention includes: a medium facing surface that faces a recording medium; a magnetic pole; and the second near-field light generating device according to the invention. The magnetic pole has an end face located in the medium facing surface, and produces a recording magnetic field for recording data on the recording medium. The near-field light generating part is located in the medium facing surface. The near-field light generating device generates near-field light that is to be applied to the recording medium when data is recorded on the recording medium using the recording magnetic field. In addition to the encasing layer and the near-field light generating element, the near-field light generating device further has a waveguide that allows propagation of light to be used for exciting a surface plasmon on the near-field light generating element. The waveguide has an outer surface that includes an opposed portion opposed to a part of the coupling portion.

The second heat-assisted magnetic recording head according to the present invention may further include a substrate on which the magnetic pole and the near-field light generating device are stacked. In this case, the substrate may have a top surface that faces the magnetic pole and the near-field light generating device, and the near-field light generating device may be located farther from the top surface of the substrate than is the magnetic pole.

In the first near-field light generating device and the method of manufacturing the same according to the present invention, or the first heat-assisted magnetic recording head according to the present invention, the near-field light generating element has the outer surface including: the first end face that includes the near-field light generating part; the second end face opposite to the first end face; and the coupling portion that couples the first end face and the second end face to each other. The coupling portion includes the top surface, the first side surface and the second side surface. The distance between the first side surface and the second side surface decreases with increasing distance from the top surface of the coupling portion. The first end face includes: the first side that is located at an end of the first side surface; the second side that is located at an end of the second side surface; the third side that is located at an end of the top surface of the coupling portion; and the pointed tip that is formed by contact of the first and second sides with each other and constitutes the near-field light generating part. Each of the first side and the second side includes an upper part and a lower part that are continuous with each other. The angle formed between the lower part of the first side and the lower part of the second side is smaller than that formed between the upper part of the first side and the upper part of the second side. According to the present invention, the near-field light generating element of the foregoing shape allows a lot of surface plasmons to concentrate at the near-field light generating part of pointed shape.

In the second near-field light generating device according to the present invention or the second heat-assisted magnetic recording head according to the present invention, the near-field light generating element has the outer surface including: the first end face that includes the near-field light generating part; the second end face opposite to the first end face; and the coupling portion that couples the first end face and the second end face to each other. The coupling portion includes the top surface, the first side surface and the second side surface. The distance between the first side surface and the second side surface decreases with increasing distance from the top surface of the coupling portion. The first end face includes: the first side that is located at an end of the first side surface; the second side that is located at an end of the second side surface; the third side that is located at an end of the top surface of the coupling portion; and the pointed tip that is formed by contact of the first and second sides with each other and constitutes the near-field light generating part. The top surface of the coupling portion has the first border that is located at the top end of the first end face, the second border that is located at the top end of the second end face, the third border that is located at the top end of the first side surface, and the fourth border that is located at the top end of the second side surface. The third border and the fourth border have their respective portions that decrease in distance from each other in a direction parallel to the first border with decreasing distance to the first border. The corner portion between the second border and the third border and the corner portion between the second border and the fourth border are both rounded. According to the present invention, the near-field light generating element of the foregoing shape allows a lot of surface plasmons to concentrate at the near-field light generating part of pointed shape.

Other and further objects, features and advantages of the present invention will appear more fully from the following description.

DETAILED DESCRIPTION OF THE PREFERRED EMBODIMENTS

First Embodiment

Figure 7:
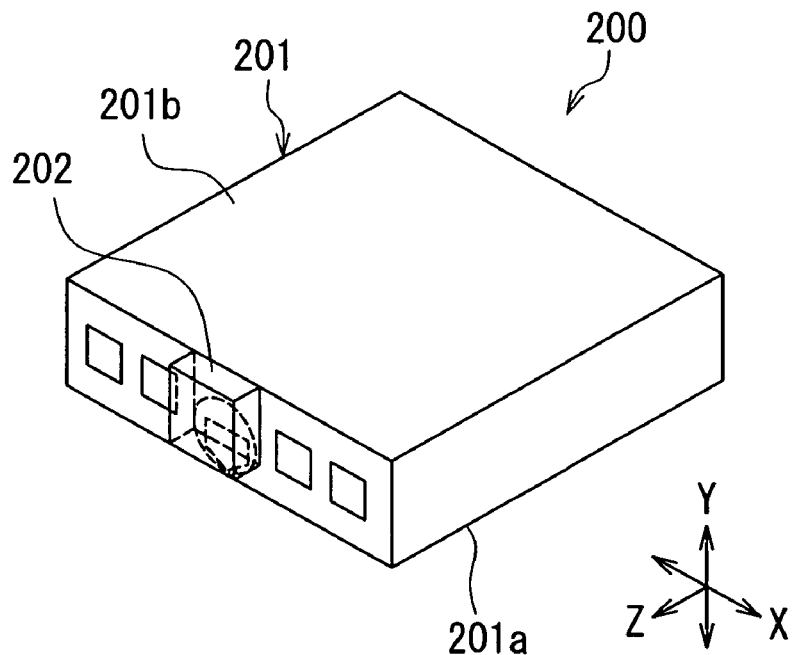
FIG. 7 is a perspective view of a slider including the heat-assisted magnetic recording head of FIG. 3.

Preferred embodiments of the present invention will now be described in detail with reference to the drawings. Reference is first made to FIG. 7 to describe a magnetic disk drive and a slider including a heat-assisted magnetic recording head according to a first embodiment of the invention. FIG. 7 is a perspective view of the slider including the heat-assisted magnetic recording head according to the present embodiment.

The magnetic disk drive of the present embodiment incorporates the slider 200 including the heat-assisted magnetic recording head according to the present embodiment. The slider 200 is supported by a suspension (not shown) and is disposed to face a circular-plate-shaped recording medium (magnetic disk) that is driven to rotate. In FIG. 7 the X direction is a direction across the tracks of the recording medium, the Y direction is a direction perpendicular to the surface of the recording medium, and the Z direction is the direction of travel of the recording medium as seen from the slider 200. The X direction, the Y direction and the Z direction are orthogonal to one another.

The slider 200 includes a slider main body 201, and a laser diode 202 as a light source joined to the slider main body 201. The slider main body 201 is nearly hexahedron-shaped and has a medium facing surface 201a that faces the recording medium, and a rear surface 201b opposite to the medium facing surface 201a.

When the recording medium rotates and travels in the Z direction, an airflow passing between the recording medium and the slider main body 201 generates a lift on the upper side in the Y direction of FIG. 7, and the lift is exerted on the slider main body 201. The lift causes the slider main body 201 to slightly fly over the surface of the recording medium.

Figure 1:
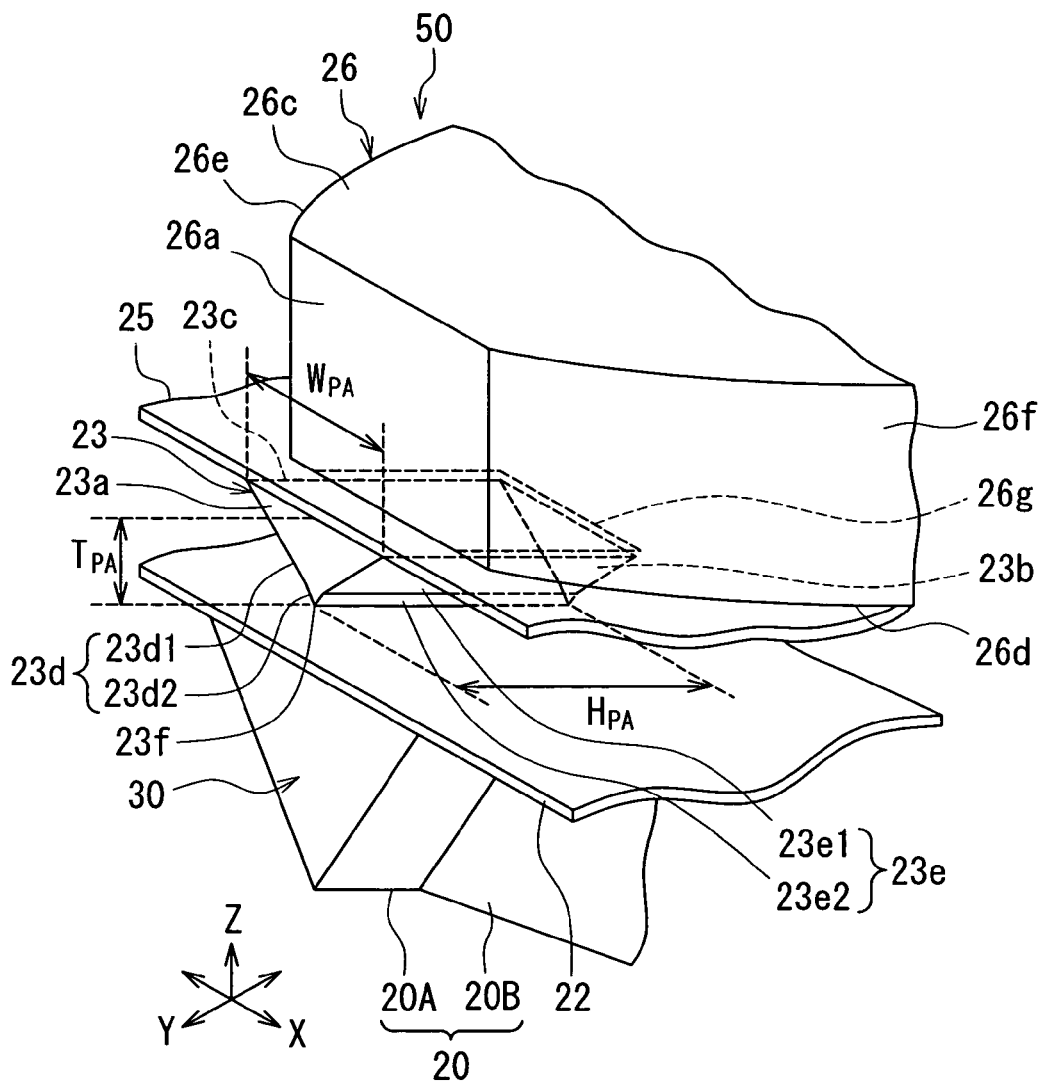
FIG. 1 is a perspective view showing the main part of a heat-assisted magnetic recording head according to a first embodiment of the invention.
Figure 2:
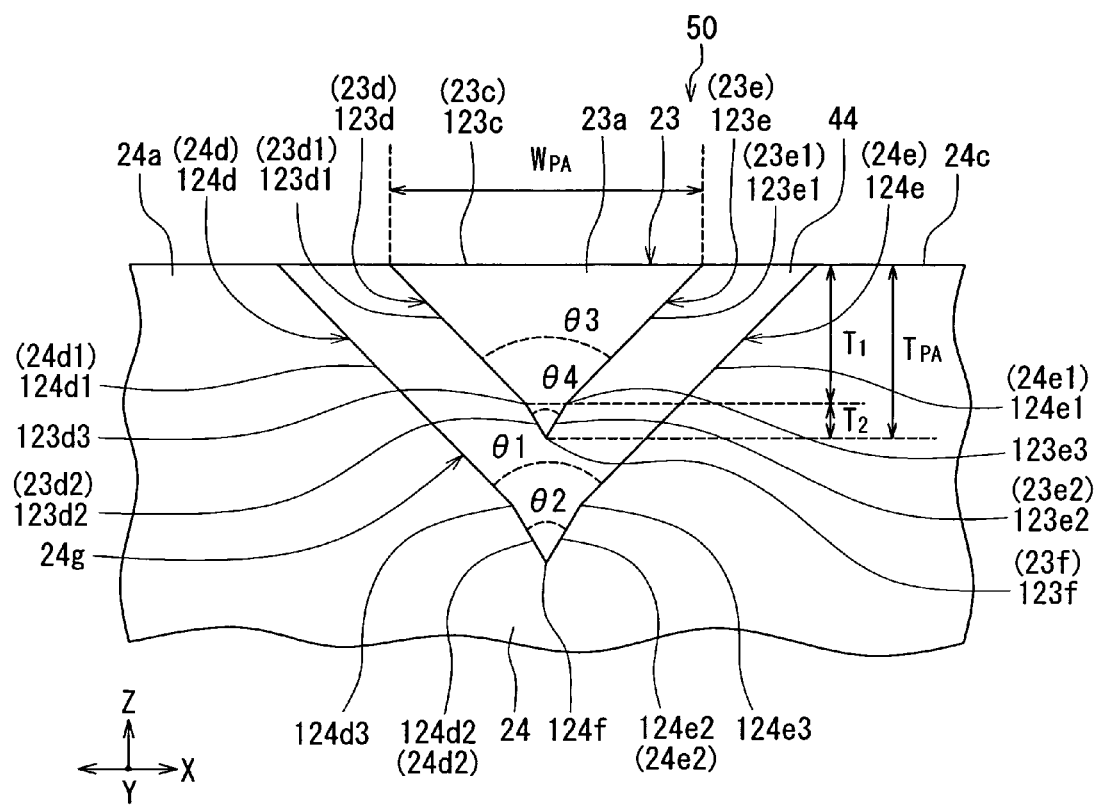
FIG. 2 is a front view showing a near-field light generating element of the heat-assisted magnetic recording head according to the first embodiment of the invention.
Figure 3:
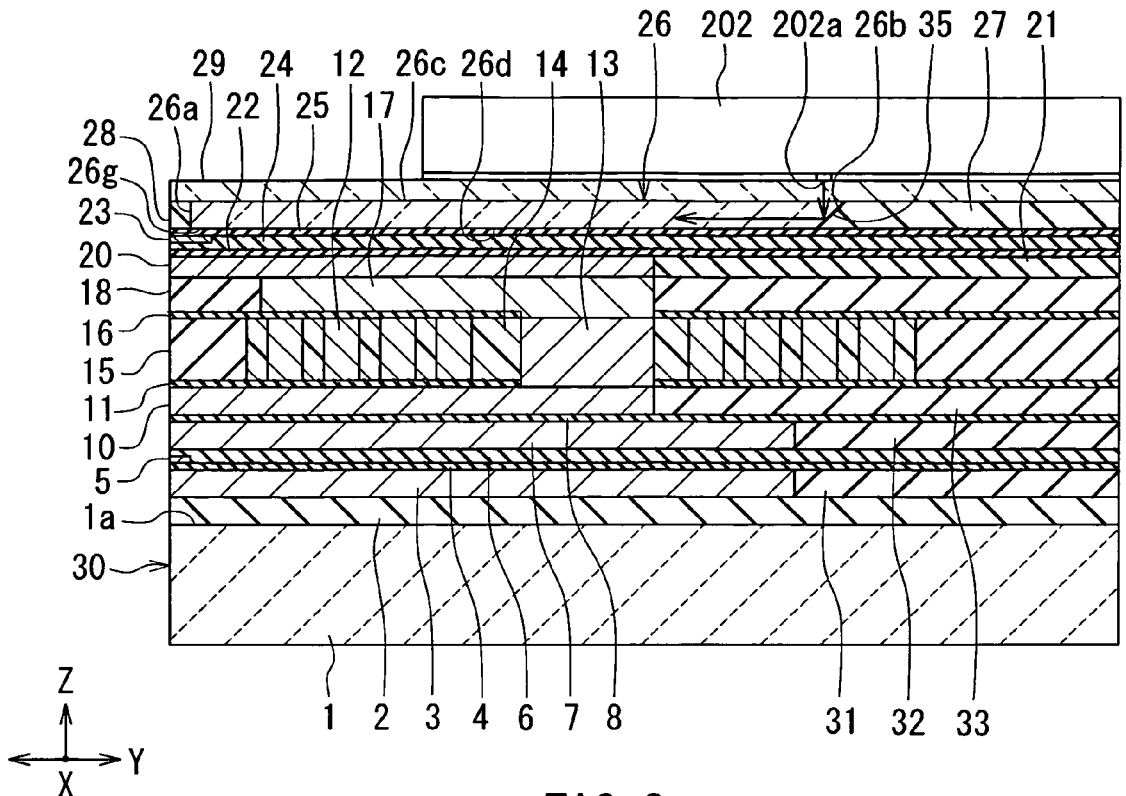
FIG. 3 is a cross-sectional view showing the configuration of the heat-assisted magnetic recording head according to the first embodiment of the invention.
Figure 4:
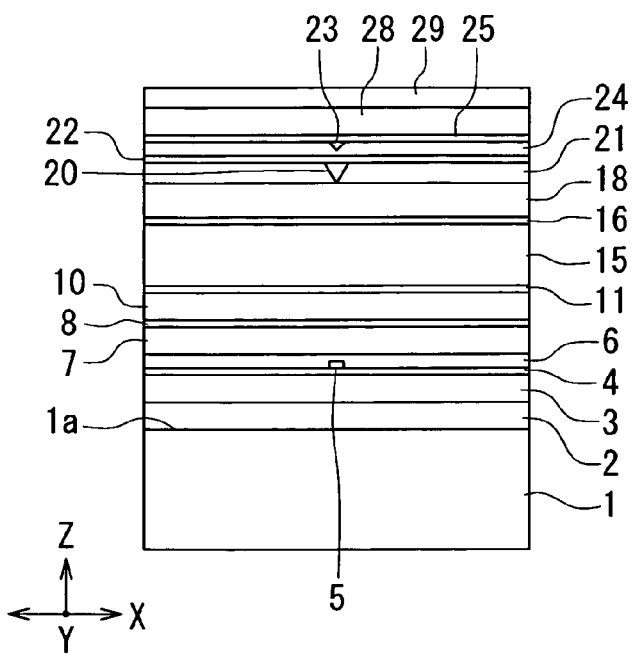
FIG. 4 is a front view showing the medium facing surface of the heat-assisted magnetic recording head of FIG. 3.
Figure 5:
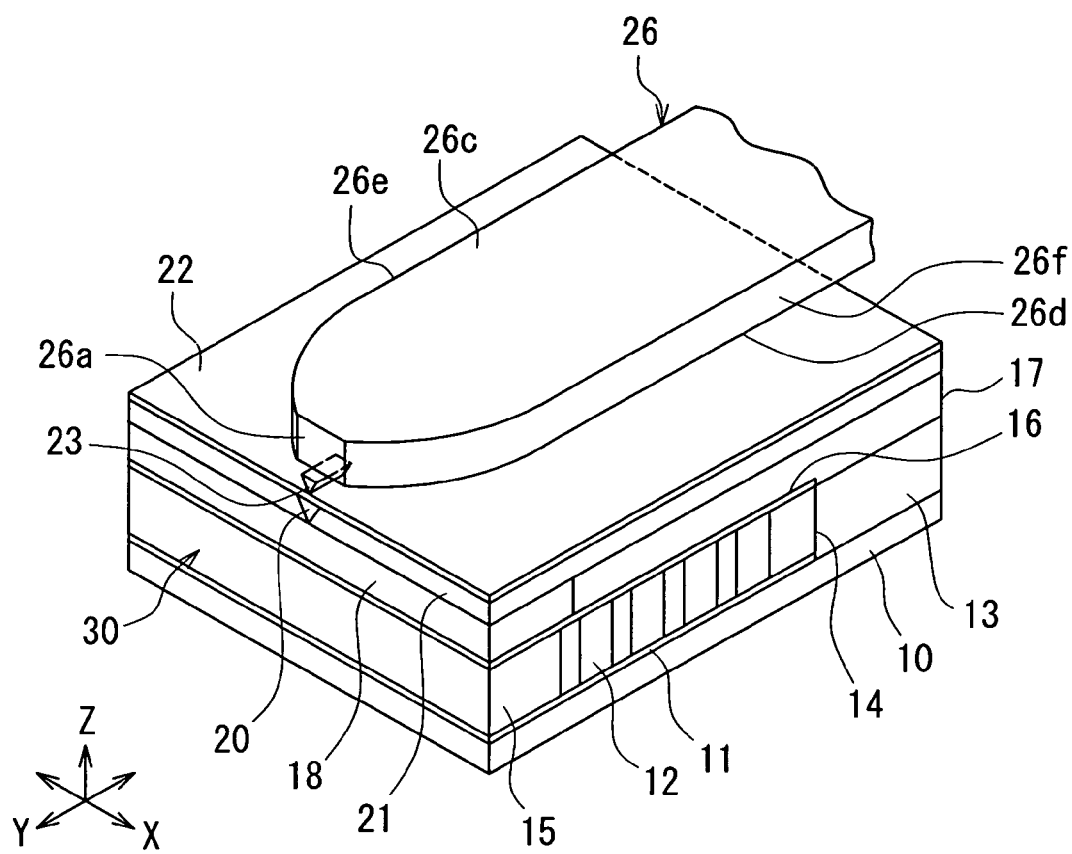
FIG. 5 is a perspective view showing the main part of the heat-assisted magnetic recording head of FIG. 3.
Figure 6:
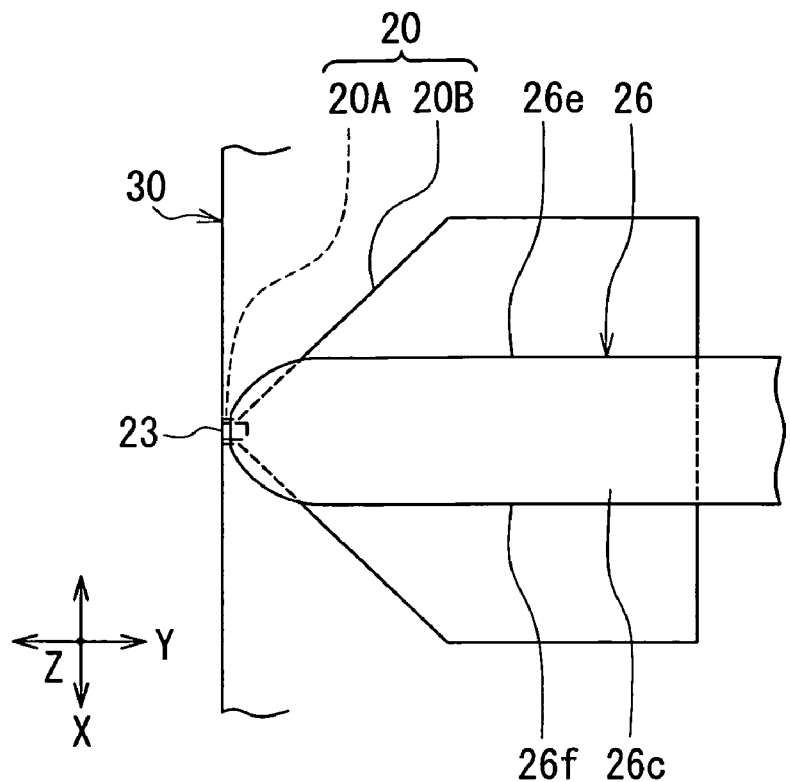
FIG. 6 is a plan view showing a magnetic pole, the near-field light generating element and a waveguide of the heat-assisted magnetic recording head of FIG. 3.

Reference is now made to FIG. 1 to FIG. 6 to describe the configuration of the heat-assisted magnetic recording head according to the present embodiment. FIG. 1 is a perspective view showing the main part of the heat-assisted magnetic recording head. FIG. 2 is a front view showing a near-field light generating element of the heat-assisted magnetic recording head. FIG. 3 is a cross-sectional view showing the configuration of the heat-assisted magnetic recording head. FIG. 4 is a front view showing the medium facing surface of the heat-assisted magnetic recording head. FIG. 5 is a perspective view showing the main part of the heat-assisted magnetic recording head. FIG. 6 is a plan view showing a magnetic pole, the near-field light generating element and a waveguide of the heat-assisted magnetic recording head. FIG. 3 shows a cross section perpendicular to the medium facing surface and the top surface of the substrate. The X, Y and Z directions shown in FIG. 7 are also shown in FIG. 1 to FIG. 6. In FIG. 2 and FIG. 4 the Y direction is orthogonal to the X and Z directions. In FIG. 3 the X direction is orthogonal to the Y and Z directions. In FIG. 6 the Z direction is orthogonal to the X and Y directions. A track width direction is the same as the X direction.

As shown in FIG. 3 and FIG. 4, the heat-assisted magnetic recording head according to the present embodiment has a medium facing surface 30 that faces the recording medium. The heat-assisted magnetic recording head includes: a substrate 1 made of a ceramic material such as aluminum oxide-titanium carbide ($Al_2O_3$—TiC) and having a top surface 1a; an insulating layer 2 made of an insulating material and disposed on the top surface 1a of the substrate 1; a bottom shield layer 3 made of a magnetic material and disposed on the insulating layer 2; and an insulating layer 31 made of an insulating material and disposed around the bottom shield layer 3 on the insulating layer 2. The insulating layers 2 and 31 are made of alumina ($Al_2O_3$), for example. The bottom shield layer 3 and the insulating layer 31 are flattened at the top.

The heat-assisted magnetic recording head further includes: a bottom shield gap film 4 which is an insulating film disposed over the top surfaces of the bottom shield layer 3 and the insulating layer 31; a magnetoresistive (MR) element 5 as a read element disposed on the bottom shield gap film 4; a top shield gap film 6 which is an insulating film disposed on the MR element 5; a top shield layer 7 made of a magnetic material and disposed on the top shield gap film 6; and an insulating layer 32 made of an insulating material and disposed around the top shield layer 7 on the top shield gap film 6. The insulating layer 32 is made of alumina, for example. The top shield layer 7 and the insulating layer 32 are flattened at the top.

An end of the MR element 5 is located in the medium facing surface 30 that faces the recording medium. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction nearly parallel to the plane of layers constituting the GMR element or the current-perpendicular-to-plane (CPP) type in which the current used for detecting magnetic signals is fed in a direction nearly perpendicular to the plane of layers constituting the GMR element. The parts from the bottom shield layer 3 to the top shield layer 7 constitute a reproducing head.

The heat-assisted magnetic recording head further includes: a nonmagnetic layer 8 made of a nonmagnetic material and disposed over the top surfaces of the top shield layer 7 and the insulating layer 32; a return magnetic pole layer 10 made of a magnetic material and disposed on the nonmagnetic layer 8; and an insulating layer 33 made of an insulating material and disposed around the return magnetic pole layer 10 on the nonmagnetic layer 8. The nonmagnetic layer 8 and the insulating layer 33 are made of alumina, for example. The return magnetic pole layer 10 and the insulating layer 33 are flattened at the top.

The heat-assisted magnetic recording head further includes: an insulating layer 11 disposed on part of the top surfaces of the return magnetic pole layer 10 and the insulating layer 33; a coil 12 disposed on the insulating layer 11; and a coupling layer 13 disposed on the return magnetic pole layer 10. The return magnetic pole layer 10 and the coupling layer 13 are each made of a magnetic material. The material of the return magnetic pole layer 10 and the coupling layer 13 may be CoFeN, CoNiFe, NiFe or CoFe, for example. The insulating layer 11 is made of alumina, for example. The coil 12 produces a magnetic field corresponding to data to be recorded on the recording medium. The coil 12 is planar spiral-shaped and wound around the coupling layer 13. The coil 12 is made of a conductive material such as copper.

The heat-assisted magnetic recording head further includes: an insulating layer 14 made of an insulating material and disposed around the coil 12 and in the space between every adjacent turns of the coil 12; an insulating layer 15 disposed around the insulating layer 14 and the coupling layer 13 on the insulating layer 11; and an insulating layer 16 disposed over the coil 12 and the insulating layers 14 and 15. The coil 12, the coupling layer 13 and the insulating layers 14 and 15 are flattened at the top. The insulating layer 14 is made of photoresist, for example. The insulating layers 15 and 16 are made of alumina, for example.

The heat-assisted magnetic recording head further includes: a bottom yoke layer 17 made of a magnetic material and disposed over the coupling layer 13 and the insulating layer 16; and a nonmagnetic layer 18 made of a nonmagnetic material and disposed around the bottom yoke layer 17 on the insulating layer 16. The material of the bottom yoke layer 17 may be CoFeN, CoNiFe, NiFe or CoFe, for example. The nonmagnetic layer 18 is made of alumina, for example. The bottom yoke layer 17 has an end face that is closer to the medium facing surface 30, and this end face is located at a distance from the medium facing surface 30. The bottom yoke layer 17 and the nonmagnetic layer 18 are flattened at the top.

The heat-assisted magnetic recording head further includes: a magnetic pole 20 disposed over the bottom yoke layer 17 and the nonmagnetic layer 18; and a nonmagnetic layer 21 made of a nonmagnetic material and disposed around the magnetic pole 20 on the nonmagnetic layer 18. The magnetic pole 20 has an end face located in the medium facing surface 30. The magnetic pole 20 passes a magnetic flux corresponding to the magnetic field produced by the coil 12, and produces a recording magnetic field for recording data on the recording medium by means of a perpendicular magnetic recording system. The magnetic pole 20 is made of a magnetic metal material. The material of the magnetic pole 20 may be NiFe, CoNiFe or CoFe, for example. The nonmagnetic layer 21 is made of alumina, for example. The magnetic pole 20 and the nonmagnetic layer 21 are flattened at the top.

As shown in FIG. 1 and FIG. 6, the magnetic pole 20 includes a track width defining portion 20A and a wide portion 20B. The track width defining portion 20A has an end face located in the medium facing surface 30 and an end opposite thereto. The wide portion 20B is connected to the end of the track width defining portion 20A and has a width greater than that of the track width defining portion 20A. The width of the track width defining portion 20A does not change with the distance from the medium facing surface 30. For example, the wide portion 20B is equal in width to the track width defining portion 20A at the boundary with the track width defining portion 20A, and gradually increases in width with increasing distance from the medium facing surface 30 and then maintains a specific width to the end of the wide portion 20B. FIG. 1, FIG. 4 and FIG. 5 show an example in which the end face of the track width defining portion 20A located in the medium facing surface 30 is shaped like an isosceles triangle with its vertex downward. However, the end face of the track width defining portion 20A located in the medium facing surface 30 may have a rectangular or trapezoidal shape.

The heat-assisted magnetic recording head further includes an insulating layer 22 disposed over the top surfaces of the magnetic pole 20 and the nonmagnetic layer 21. The insulating layer 22 is made of alumina, for example. The insulating layer 22 has a thickness within the range of 30 to 70 nm, for example.

The heat-assisted magnetic recording head further includes an encasing layer 24 made of a dielectric material and disposed on the insulating layer 22. The encasing layer 24 is made of $Ta_2O_5$ or alumina, for example. As shown in FIG. 2, the encasing layer 24 has a top surface 24c, and a groove 24g that opens in the top surface 24c. The heat-assisted magnetic recording head further includes a dielectric film 44 and a near-field light generating element 23 accommodated in the groove 24g of the encasing layer 24. Illustration of the dielectric film 44 is omitted in FIG. 1, FIG. 3 and FIG. 6. As shown in FIG. 2, the dielectric film 44 is disposed between the near-field light generating element 23 and the wall faces of the groove 24g. The dielectric film 44 is made of a dielectric material such as alumina. The top surface 24c of the encasing layer 24 and the top surfaces of the near-field light generating element 23 and the dielectric film 44 are flattened. The near-field light generating element 23 is made of metal. Specifically, the near-field light generating element 23 is made of one of Au, Ag, Al, Cu, Pd, Pt, Rh and Ir, or an alloy composed of two or more of these, for example.

As shown in FIG. 1, the near-field light generating element 23 has a near-field light generating part 23f located in the medium facing surface 30. The near-field light generating element 23 is generally shaped like a triangular prism, having an outer surface described below. The outer surface of the near-field light generating element 23 includes: a first end face 23a located in the medium facing surface 30; a second end face 23b opposite to the first end face 23a; and a coupling portion that couples the first end face 23a and the second end face 23b to each other. The coupling portion includes a top surface 23c that is farther from the top surface 1a of the substrate 1, and two side surfaces 23d and 23e that decrease in distance from each other with increasing distance from the top surface 23c. The first end face 23a includes the near-field light generating part 23f. As shown in FIG. 2, the encasing layer 24 has an end face 24a that is located in the same plane as the first end face 23a.

The shapes of the groove 24g of the encasing layer 24 and the near-field light generating element 23 will now be described in detail with reference to FIG. 1 and FIG. 2. As shown in FIG. 2, the groove 24g has a first sidewall 24d and a second sidewall 24e that decrease in distance from each other with increasing distance from the top surface 24c of the encasing layer 24. The first sidewall 24d includes an upper part 24d1 and a lower part 24d2 that are continuous with each other. The second sidewall 24e includes an upper part 24e1 and a lower part 24e2 that are continuous with each other. The upper part 24d1, the lower part 24d2, the upper part 24e1 and the lower part 24e2 are each planar or almost planar in shape. The lower part 24d2 of the first sidewall 24d and the lower part 24e2 of the second sidewall 24e are in contact with each other to form the bottom of the groove 24g.

Here, the angle formed between the upper part 24d1 of the first sidewall 24d and the upper part 24e1 of the second sidewall 24e will be designated by the symbol θ1. The angle formed between the lower part 24d2 of the first sidewall 24d and the lower part 24e2 of the second sidewall 24e will be designated by the symbol θ2. The angle θ2 is smaller than the angle θ1. It should be appreciated that the angle formed between the upper part 24d1 of the first sidewall 24d and the upper part 24e1 of the second sidewall 24e refers to the angle that is formed between a virtual plane including the approximate plane of the upper part 24d1 and a virtual plane including the approximate plane of the upper part 24e1.

The first sidewall 24d includes a first edge 124d that lies in the end face 24a. The second sidewall 24e includes a second edge 124e that lies in the end face 24a. The first edge 124d includes an upper part 124d1 and a lower part 124d2 that are continuous with each other. The second edge 124e includes an upper part 124e1 and a lower part 124e2 that are continuous with each other. The upper part 124d1, the lower part 124d2, the upper part 124e1 and the lower part 124e2 are each straight-line-shaped or almost straight-line-shaped. In FIG. 2, the symbol 124d3 designates the point of connection between the upper part 124d1 and the lower part 124d2, the symbol 124e3 designates the point of connection between the upper part 124e1 and the lower part 124e2, and the symbol 124f designates the point of connection between the lower part 124d2 and the lower part 124e2.

The angle formed between the upper part 124d1 of the first edge 124d and the upper part 124e1 of the second edge 124e is equal to the angle θ1 formed between the upper part 24d1 of the first sidewall 24d and the upper part 24e1 of the second sidewall 24e. The angle formed between the lower part 124d2 of the first edge 124d and the lower part 124e2 of the second edge 124e is equal to the angle θ2 formed between the lower part 24d2 of the first sidewall 24d and the lower part 24e2 of the second sidewall 24e. Therefore, the angle θ2 formed between the lower part 124d2 of the first edge 124d and the lower part 124e2 of the second edge 124e is smaller than the angle θ1 formed between the upper part 124d1 of the first edge 124d and the upper part 124e1 of the second edge 124e.

It should be appreciated that the angle formed between the upper part 124d1 of the first edge 124d and the upper part 124e1 of the second edge 124e refers to the angle that is formed between an extension of the approximate line of the upper part 124d1 and an extension of the approximate line of the upper part 124e1.

The angle θ1 preferably falls within the range of 60° to 120°. The angle θ2 preferably falls within the range of 30° to 60°.

The first side surface 23d of the near-field light generating element 23 is opposed to the first sidewall 24d of the groove 24g. The second side surface 23e of the near-field light generating element 23 is opposed to the second sidewall 24e of the groove 24g. The first side surface 23d includes an upper part 23d1 and a lower part 23d2 that are continuous with each other. The second side surface 23e includes an upper part 23e1 and a lower part 23e2 that are continuous with each other. The upper part 23d1, the lower part 23d2, the upper part 23e1 and the lower part 23e2 are each planar or almost planar in shape. The lower part 23d2 of the first side surface 23d and the lower part 23e2 of the second side surface 23e are in contact with each other to form an edge.

Here, the angle formed between the upper part 23d1 of the first side surface 23d and the upper part 23e1 of the second side surface 23e will be designated by the symbol θ3. The angle formed between the lower part 23d2 of the first side surface 23d and the lower part 23e2 of the second side surface 23e will be designated by the symbol θ4. The angle θ4 is smaller than the angle θ3. It should be appreciated that the angle formed between the upper part 23d1 of the first side surface 23d and the upper part 23e1 of the second side surface 23e refers to the angle that is formed between a virtual plane including the approximate plane of the upper part 23d1 and a virtual plane including the approximate plane of the upper part 23e1.

The first end face 23a of the near-field light generating element 23 includes: a first side 123d that is located at an end of the first side surface 23d; a second side 123e that is located at an end of the second side surface 23e; a third side 123c that is located at an end of the top surface 23c; and a pointed tip 123f that is formed by contact of the first side 123d and the second side 123e with each other and constitutes the near-field light generating part 23f. Specifically, the near-field light generating part 23f refers to the pointed tip 123f and its vicinity in the end face 23a.

The first side 123d includes an upper part 123d1 and a lower part 123d2 that are continuous with each other. The second side 123e includes an upper part 123e1 and a lower part 123e2 that are continuous with each other. The upper part 123d1, the lower part 123d2, the upper part 123e1 and the lower part 123e2 are each straight-line-shaped or almost straight-line-shaped. In FIG. 2, the symbol 123d3 designates the point of connection between the upper part 123d1 and the lower part 123d2, and the symbol 12333 designates the point of connection between the upper part 123e1 and the lower part 123e2.

The angle formed between the upper part 123d1 of the first side 123d and the upper part 123e1 of the second side 123e is equal to the angle θ3 formed between the upper part 23d1 of the first side surface 23d and the upper part 23e1 of the second side surface 23e. The angle formed between the lower part 123d2 of the first side 123d and the lower part 123e2 of the second side 123e is equal to the angle θ4 formed between the lower part 23d2 of the first side surface 23d and the lower part 23e2 of the second side surface 23e. Therefore, the angle θ4 formed between the lower part 123d2 of the first side 123d and the lower part 123e2 of the second side 123e is smaller than the angle θ3 formed between the upper part 123d1 of the first side 123d and the upper part 123e1 of the second side 123e. It should be appreciated that the angle formed between the upper part 123d1 of the first side 123d and the upper part 123e1 of the second side 123e refers to the angle that is formed between an extension of the approximate line of the upper part 123d1 and an extension of the approximate line of the upper part 123e1.

The angle θ3 preferably falls within the range of 60° to 120°. The angle θ4 preferably falls within the range of 30° to 60°.

As shown in FIG. 1, the length of the near-field light generating element 23 in the direction perpendicular to the medium facing surface 30 and the first end face 23a will be designated by the symbol $H_{PA}$; the width of the first end face 23a at its top end will be designated by the symbol $W_{PA}$; and the length of the first end face 23a in the direction perpendicular to the top surface 1a of the substrate 1 and the top surface 24c of the encasing layer 24 will be designated by the symbol $T_{PA}$ as shown in FIG. 1 and FIG. 2. The length $H_{PA}$ of the near-field light generating element 23 in the direction perpendicular to the medium facing surface 30 and the first end face 23a is greater than the length $T_{PA}$ of the first end face 23a in the direction perpendicular to the top surface 1a of the substrate 1 and the top surface 24c of the encasing layer 24. Both of $W_{PA}$ and $T_{PA}$ are smaller than or equal to the wavelength of light propagating through a waveguide to be described later. $W_{PA}$ falls within the range of 50 to 350 nm, for example. $T_{PA}$ falls within the range of 60 to 350 nm, for example. $H_{PA}$ falls within the range of 0.25 to 2.5 μm, for example.

As shown in FIG. 2, the distance between the third side 123c and a virtual straight line passing through the points of connection 123d3 and 123e3 will be designated by the symbol $T_1$. The distance between the foregoing virtual straight line and the pointed tip 123f will be designated by the symbol $T_2$. $T_1$ falls within the range of 50 to 300 nm, for example. $T_2$ falls within the range of 10 to 50 nm, for example.

The heat-assisted magnetic recording head further includes: an interposition layer 25 disposed over the top surfaces of the near-field light generating element 23 and the encasing layer 24; and a waveguide 26 and clad layers 27 and 28 disposed on the interposition layer 25. The waveguide 26 is made of a dielectric material that transmits laser light to be described later. The interposition layer 25 is made of a dielectric material that has a refractive index lower than that of the waveguide 26 and transmits the laser light. The clad layers 27 and 28 are made of a dielectric material that has a refractive index lower than that of the waveguide 26. For example, the waveguide 26 may be made of $Ta_2O_5$ which has a refractive index of approximately 2.1, and the interposition layer 25 and the clad layers 27 and 28 may be made of alumina which has a refractive index of approximately 1.8. The interposition layer 25 has a thickness within the range of 30 to 70 nm, for example.

As shown in FIG. 3, FIG. 5 and FIG. 6, the waveguide 26 extends in the direction perpendicular to the medium facing surface 30 (the Y direction). The waveguide 26 has an outer surface. The outer surface has: a front end face 26a that is closer to the medium facing surface 30; a rear end face 26b that is farther from the medium facing surface 30; a top surface 26c that is farther from the top surface 1a of the substrate 1; a bottom surface 26d that is closer to the top surface 1a of the substrate 1; and two side surfaces 26e and 26f that are opposite to each other in the track width direction. FIG. 3 shows an example in which the front end face 26a is located away from the medium facing surface 30. The front end face 26a may be located in the medium facing surface 30, however. The clad layer 27 is located farther from the medium facing surface 30 than is the rear end face 26b. The clad layer 28 is arranged around the waveguide 26 and the clad layer 27. The waveguide 26 and the clad layers 27 and 28 are flattened at the top.

The outer surface of the waveguide 26 includes an opposed portion 26g that is opposed to a part of the coupling portion of the outer surface of the near-field light generating element 23. In the present embodiment, as shown in FIG. 3, the waveguide 26 is disposed farther from the top surface 1a of the substrate 1 than is the near-field light generating element 23, and a part of the bottom surface 26d of the waveguide 26 is opposed to a part of the top surface 23c of the near-field light generating element 23 with the interposition layer 25 interposed therebetween. This part of the bottom surface 26d of the waveguide 26 opposed to the part of the top surface 23c is the opposed portion 26g. The previously-mentioned configuration that the length $H_{PA}$ of the near-field light generating element 23 in the direction perpendicular to the medium facing surface 30 is greater than the length $T_{PA}$ of the first end face 23a in the direction perpendicular to the top surface 1a of the substrate 1 is necessary in order that the opposed portion 26g, which is a part of the bottom surface 26d of the waveguide 26, is opposed to a part of the top surface 23c of the near-field light generating element 23 with the interposition layer 25 interposed therebetween.

As shown in FIG. 3, the rear end face 26b is an oblique surface inclined at an angle of 45° with respect to the direction perpendicular to the top surface 1a of the substrate 1. The distance between the medium facing surface 30 and an arbitrary point on the rear end face 26b increases with increasing distance between the arbitrary point and the top surface 1a of the substrate 1.

The heat-assisted magnetic recording head further includes a mirror 35 that is disposed between the waveguide 26 and the clad layer 27 so as to be in contact with the rear end face 26b of the waveguide 26. The mirror 35 is made of a film of a metal such as Cu or Au having a thickness of 50 to 200 nm or so. The mirror 35 is configured to reflect light emitted from the light source disposed above the waveguide 26, so as to let the light travel through the waveguide 26 toward the medium facing surface 30. More specifically, the mirror 35 is configured to reflect light that enters the waveguide 26 from the top surface 26c of the waveguide 26 and reaches the rear end face 26b, so as to let the light travel toward the front end face 26a.

The heat-assisted magnetic recording head further includes a clad layer 29 disposed over the top surfaces of the waveguide 26 and the clad layers 27 and 28. The clad layer 29 is made of a dielectric material that has a refractive index lower than that of the waveguide 26 and transmits laser light. For example, if the waveguide 26 is made of $Ta_2O_5$ which has a refractive index of approximately 2.1, the clad layer 29 may be made of alumina which has a refractive index of approximately 1.8. The clad layer 29 has a thickness within the range of 0.1 to 0.5 μm, for example.

The encasing layer 24, the dielectric film 44, the near-field light generating element 23, the interposition layer 25, the waveguide 26, the clad layers 27, 28 and 29, and the mirror 35 constitute a near-field light generating device 50 according to the present embodiment.

The heat-assisted magnetic recording head further includes a laser diode 202 fixed to the top surface of the clad layer 29 with an adhesive that transmits laser light, for example. The parts from the return magnetic pole layer 10 to the laser diode 202 constitute a recording head. In the present embodiment, the laser diode 202 is disposed above the waveguide 26 and is fixed to the waveguide 26 with the clad layer 29 interposed therebetween. The laser diode 202 is of surface-emission type, for example. The laser diode 202 has an emission part 202a at its bottom surface, and emits laser light downward from the emission part 202a. The laser light emitted from the emission part 202a passes through the clad layer 29, enters the waveguide 26 from the top surface 26c and reaches the rear end face 26b, where the laser light is reflected by the mirror 35 so as to travel through the waveguide 26 toward the medium facing surface 30 (the front end face 26a).

FIG. 5 and FIG. 6 show an example of the configuration of the waveguide 26. In this example, the two side surfaces 26e and 26f of the waveguide 26 are formed as a reflecting surface of parabolic shape in the vicinity of the front end face 26a as viewed from above. This reflecting surface has the function of collecting the light propagating through the waveguide 26 to the vicinity of the front end face 26a.

As has been described, the heat-assisted magnetic recording head according to the present embodiment has the medium facing surface 30 that faces the recording medium, the reproducing head, and the recording head. The reproducing head and the recording head are stacked on the substrate 1. The recording head is disposed forward of the reproducing head along the direction of travel of the recording medium (the Z direction) (in other words, disposed on the trailing side).

The reproducing head includes: the MR element 5 as the read element; the bottom shield layer 3 and the top shield layer 7 for shielding the MR element 5, the respective portions of the bottom shield layer 3 and the top shield layer 7 located near the medium facing surface 30 being opposed to each other with the MR element 5 therebetween; the bottom shield gap film 4 disposed between the MR element 5 and the bottom shield layer 3; and the top shield gap film 6 disposed between the MR element 5 and the top shield layer 7.

The recording head includes the return magnetic pole layer 10, the coil 12, the coupling layer 13, the bottom yoke layer 17, and the magnetic pole 20. The coil 12 produces a magnetic field corresponding to data to be recorded on the recording medium. The return magnetic pole layer 10, the coupling layer 13, the bottom yoke layer 17 and the magnetic pole 20 form a magnetic path for passing a magnetic flux corresponding to the magnetic field produced by the coil 12. The magnetic pole 20 allows the magnetic flux corresponding to the magnetic field produced by the coil 12 to pass and produces a recording magnetic field for recording data on the recording medium by means of the perpendicular magnetic recording system. The position of the end of a bit pattern to be recorded on the recording medium depends on the position of the top end, i.e., the end farther from the top surface 1a of the substrate 1, of the end face of the magnetic pole 20 located in the medium facing surface 30. The width of the end face of the magnetic pole 20 located in the medium facing surface 30 taken at the top end defines the track width. The return magnetic pole layer 10, the coupling layer 13 and the bottom yoke layer 17 have the function of returning a magnetic flux to the magnetic pole 20, the magnetic flux having been generated from the magnetic pole 20 and having magnetized the recording medium.

The recording head further includes the near-field light generating device 50 according to the present embodiment. The near-field light generating device 50 includes at least the encasing layer 24 and the near-field light generating element 23. The near-field light generating device 50 further includes the dielectric film 44, the interposition layer 25, the waveguide 26, the clad layers 27, 28 and 29, and the mirror 35.

The substrate 1 has the top surface 1a that faces the magnetic pole 20, the near-field light generating element 23 and the waveguide 26. The near-field light generating device 50 is disposed farther from the top surface 1a of the substrate 1 than is the magnetic pole 20.

The outer surface of the near-field light generating element 23 includes: the first end face 23a that is located in the medium facing surface 30; the second end face 23b that is farther from the medium facing surface 30; and the coupling portion that couples the first end face 23a and the second end face 23b to each other. The coupling portion includes: the top surface 23c that is farther from the top surface 1a of the substrate 1; and the two side surfaces 23d and 23e that decrease in distance from each other with increasing distance from the top surface 23c. The first end face 23a includes the near-field light generating part 23f. The length $H_{PA}$ of the near-field light generating element 23 in the direction perpendicular to the medium facing surface 30 (the Y direction) is greater than the length $T_{PA}$ of the first end face 23a in the direction perpendicular to the top surface 1a of the substrate 1. As will be detailed later, surface plasmons are excited on the near-field light generating element 23 based on the light propagating through the waveguide 26. The surface plasmons propagate to the near-field light generating part 23f, and the near-field light generating part 23f generates near-field light based on the surface plasmons.

The waveguide 26 is disposed farther from the top surface 1a of the substrate 1 than is the near-field light generating element 23. The outer surface of the waveguide 26 includes the opposed portion 26g that is opposed to a part of the top surface 23c of the near-field light generating element 23 with the interposition layer 25 interposed therebetween.

Each of the interposition layer 25 and the clad layers 27, 28 and 29 is made of a dielectric material having a refractive index lower than that of the waveguide 26. Consequently, the outer surface of the waveguide 26 excluding the rear end face 26b is covered with the dielectric material that is lower in refractive index than the waveguide 26.

The laser diode 202 is disposed above the waveguide 26 and is fixed to the waveguide 26 with the clad layer 29 interposed therebetween. The laser diode 202 emits linearly polarized laser light. The mirror 35 is arranged to be in contact with the rear end face 26b of the waveguide 26. The mirror 35 reflects the laser light emitted from the laser diode 202 so as to let the laser light travel through the waveguide 26 toward the medium facing surface 30. Note that the laser diode 202 is arranged so that the electric field of the laser light propagating through the waveguide 26 oscillates in a direction perpendicular to the opposed portion 26g (the bottom surface 26d).

Now, the principle of generation of near-field light according to the present embodiment and the principle of heat-assisted magnetic recording using the near-field light will be described in detail. The laser light emitted from the laser diode 202 passes through the clad layer 29, enters the waveguide 26 from the top surface 26c and reaches the rear end face 26b, where the laser light is reflected by the mirror 35 so as to travel through the waveguide 26 toward the medium facing surface 30 (the front end face 26a). This laser light propagates through the waveguide 26 to reach the vicinity of the opposed portion 26g. The laser light is then totally reflected at the interface between the opposed portion 26g and the interposition layer 25, and this generates evanescent light permeating into the interposition layer 25. As a result, the evanescent light and the collective oscillations of charges on the top surface 23c of the near-field light generating element 23, i.e., surface plasmons, are coupled with each other to excite a system of surface plasmon polaritons. In this way, surface plasmons are excited on the near-field light generating element 23.

The surface plasmons excited on the near-field light generating element 23 propagate along the top surface 23c and the first end face 23a of the near-field light generating element 23 toward the near-field light generating part 23f. Consequently, the surface plasmons concentrate at the near-field light generating part 23f, and near-field light thus occurs from the near-field light generating part 23f based on the surface plasmons. The near-field light is projected toward the recording medium, reaches the surface of the recording medium and heats a part of the magnetic recording layer of the recording medium. This lowers the coercivity of the part of the magnetic recording layer. In heat-assisted magnetic recording, the part of the magnetic recording layer with the lowered coercivity is subjected to a recording magnetic field produced by the magnetic pole 20 for data recording.

A method of manufacturing the heat-assisted magnetic recording head according to the present embodiment will now be described with reference to FIG. 8A to FIG. 17A and FIG. 8B to FIG. 17B. FIG. 8A to FIG. 17A each show a cross section of a stack of layers formed in the process of manufacturing the heat-assisted magnetic recording head, the cross section being perpendicular to the medium facing surface and the substrate. In FIG. 8A to FIG. 17A the symbol "ABS" indicates the position where the medium facing surface 30 is to be formed. FIG. 8B to FIG. 17B show cross sections at the position ABS of FIG. 8A to FIG. 17A, respectively.

Figure 8A:
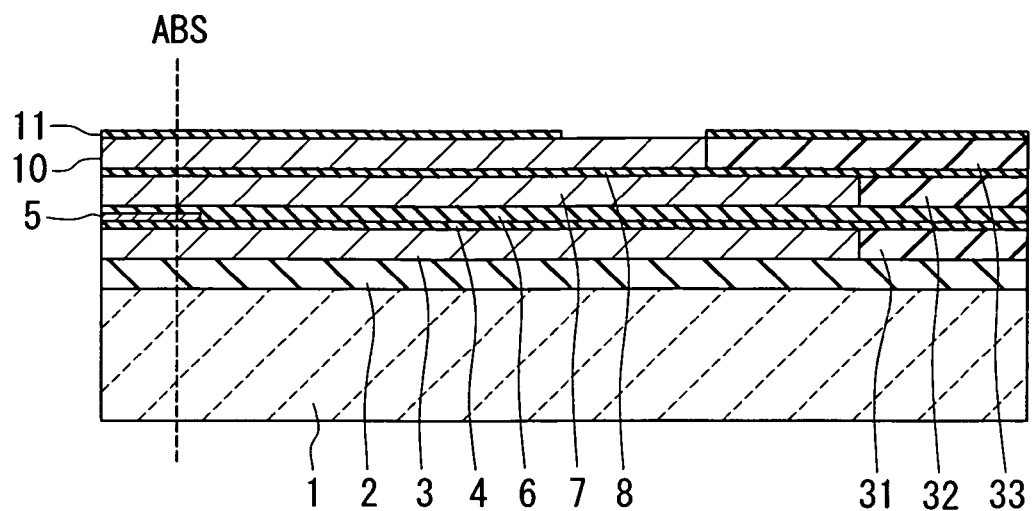
FIG. 8A and FIG. 8B are explanatory diagrams showing a step of a method of manufacturing the heat-assisted magnetic recording head according to the first embodiment of the invention.
Figure 8B:
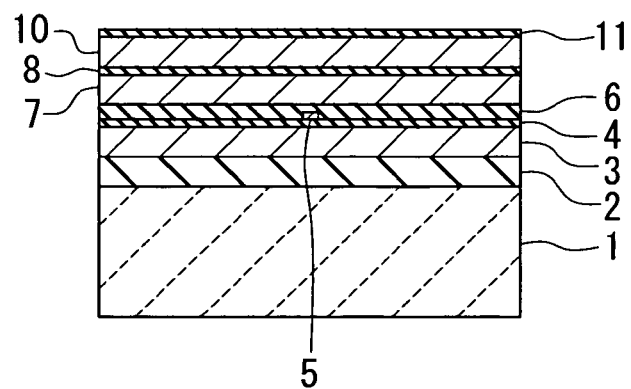

In the method of manufacturing the heat-assisted magnetic recording head according to the present embodiment, first, the insulating layer 2 is formed on the substrate 1 as shown in FIG. 8A and FIG. 8B. Next, the bottom shield layer 3 is formed on the insulating layer 2. Next, the insulating layer 31 is formed to cover the bottom shield layer 3. Next, the insulating layer 31 is polished by, for example, chemical mechanical polishing (hereinafter referred to as CMP) until the bottom shield layer 3 is exposed, whereby the bottom shield layer 3 and the insulating layer 31 are flattened at the top. Next, the bottom shield gap film 4 is formed over the bottom shield layer 3 and the insulating layer 31. Next, the MR element 5 and leads (not shown) connected to the MR element 5 are formed on the bottom shield gap film 4. Next, the top shield gap film 6 is formed to cover the MR element 5 and the leads. Next, the top shield layer 7 is formed on the top shield gap film 6. Next, the insulating layer 32 is formed to cover the top shield layer 7. Next, the insulating layer 32 is polished by, for example, CMP until the top shield layer 7 is exposed, whereby the top shield layer 7 and the insulating layer 32 are flattened at the top. Next, the nonmagnetic layer 8 is formed over the top shield layer 7 and the insulating layer 32. Next, the return magnetic pole layer 10 is formed on the nonmagnetic layer 8. Next, the insulating layer 33 is formed to cover the return magnetic pole layer 10. Next, the insulating layer 33 is polished by, for example, CMP until the return magnetic pole layer 10 is exposed, whereby the return magnetic pole layer 10 and the insulating layer 33 are flattened at the top. Next, the insulating layer 11 is formed on part of the top surfaces of the return magnetic pole layer 10 and the insulating layer 33.

Figure 9A:
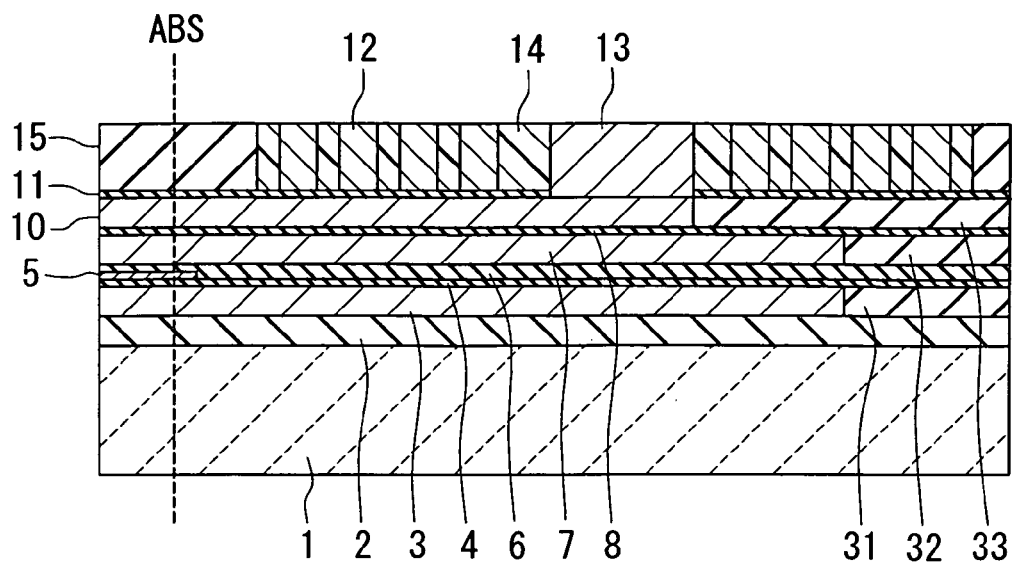
FIG. 9A and FIG. 9B are explanatory diagrams showing a step that follows the step of FIG. 8A and FIG. 8B.
Figure 9B:
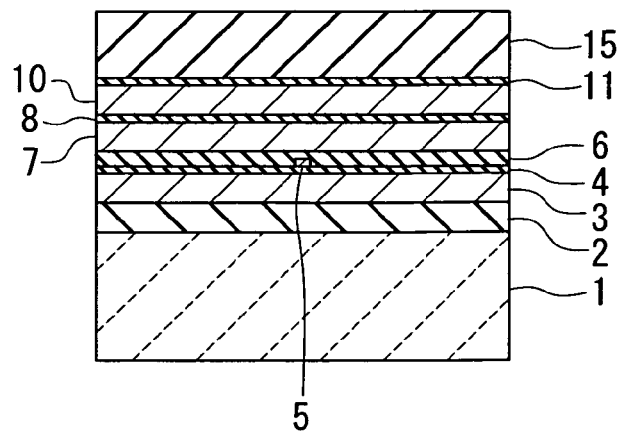

FIG. 9A and FIG. 9B show the next step. In this step, first, the coil 12 is formed on the insulating layer 11 by frame plating, for example. Next, the coupling layer 13 is formed on the return magnetic pole layer 10 by frame plating, for example. Alternatively, the coil 12 may be formed after forming the coupling layer 13. Next, the insulating layer 14 made of photoresist, for example, is selectively formed around the coil 12 and in the space between every adjacent turns of the coil 12. Next, the insulating layer 15 is formed over the entire top surface of the stack by sputtering, for example. Next, the insulating layer 15 is polished by, for example, CMP until the coil 12 and the coupling layer 13 are exposed, whereby the coil 12, the coupling layer 13 and the insulating layers 14 and 15 are flattened at the top.

Figure 10A:
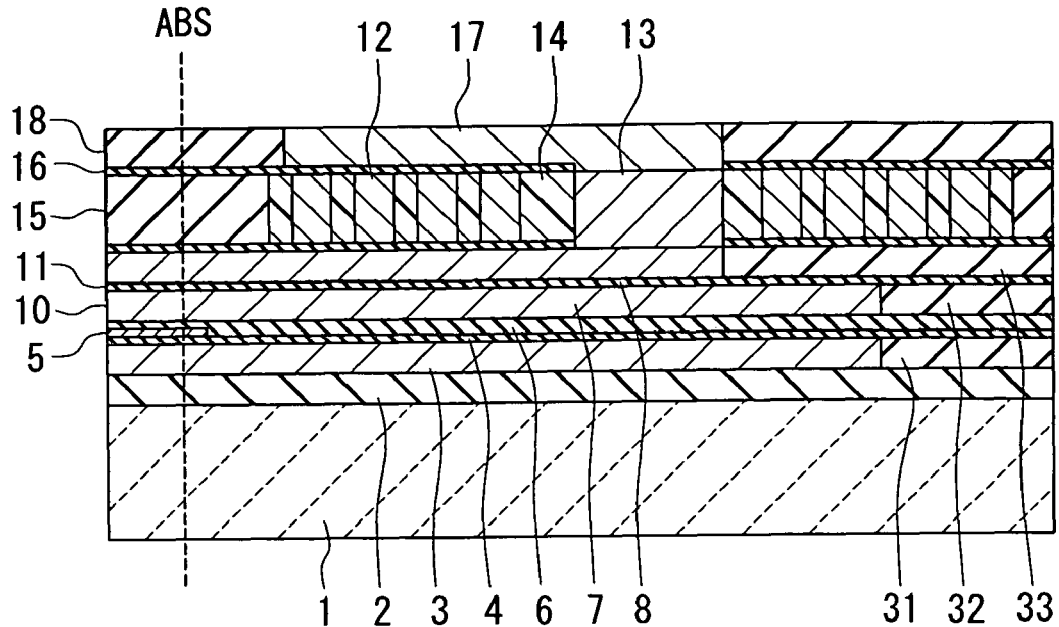
FIG. 10A and FIG. 10B are explanatory diagrams showing a step that follows the step of FIG. 9A and FIG. 9B.
Figure 10B:
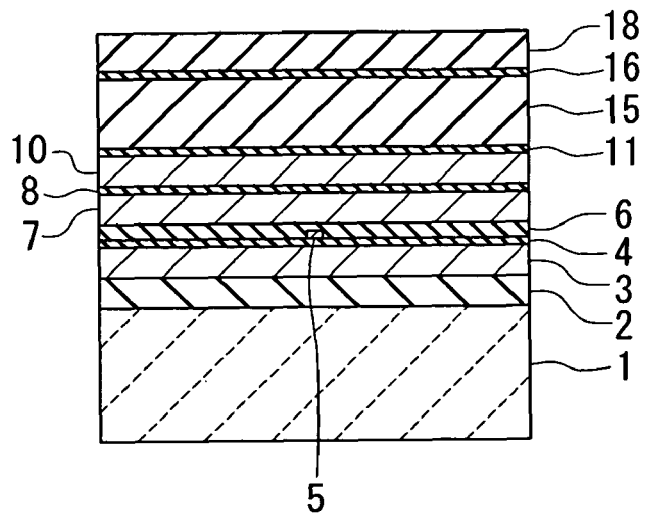

FIG. 10A and FIG. 10B show the next step. In this step, first, the bottom yoke layer 17 is formed over the coupling layer 13 and the insulating layer 16 by frame plating, for example. Next, the nonmagnetic layer 18 is formed over the entire top surface of the stack. Next, the nonmagnetic layer 18 is polished by, for example, CMP until the bottom yoke layer 17 is exposed, whereby the bottom yoke layer 17 and the nonmagnetic layer 18 are flattened at the top.

Figure 11A:
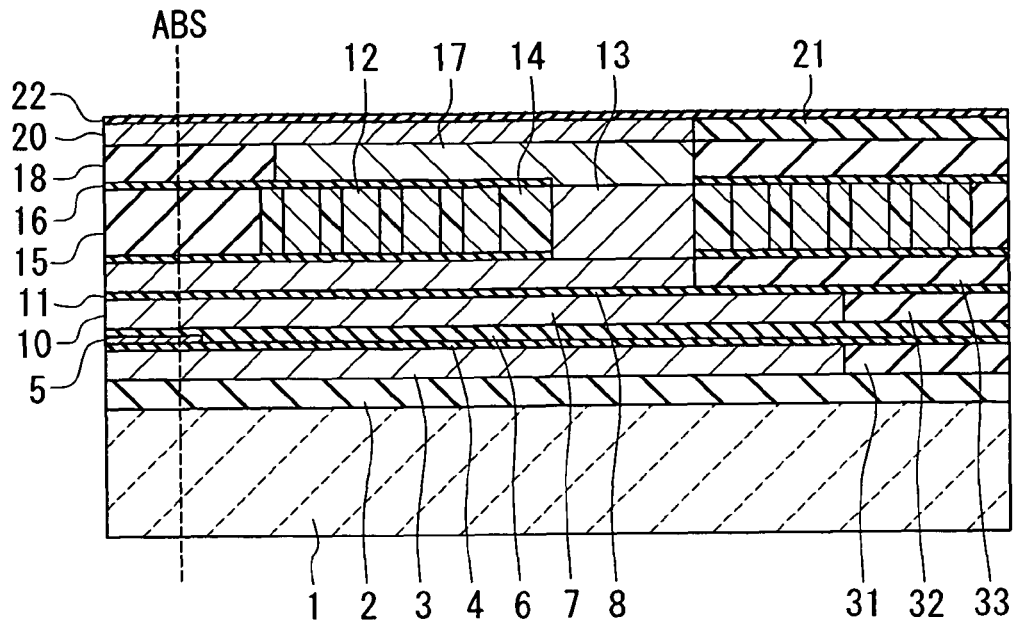
FIG. 11A and FIG. 11B are explanatory diagrams showing a step that follows the step of FIG. 10A and FIG. 10B.
Figure 11B:
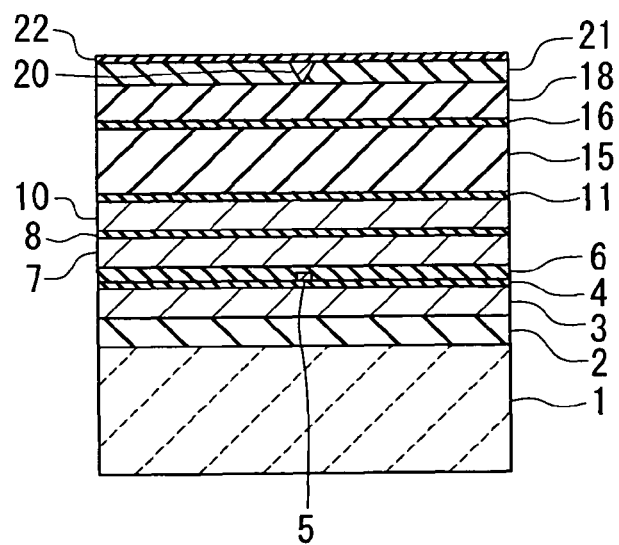

FIG. 11A and FIG. 11B show the next step. In this step, first, the nonmagnetic layer 21 is formed over the bottom yoke layer 17 and the nonmagnetic layer 18. Next, the nonmagnetic layer 21 is selectively etched to form therein a groove for accommodating the magnetic pole 20. Next, the magnetic pole 20 is formed by, for example, frame plating, such that the magnetic pole 20 is accommodated in the groove of the nonmagnetic layer 21. Next, the magnetic pole 20 and the nonmagnetic layer 21 are polished by CMP, for example. The magnetic pole 20 and the nonmagnetic layer 21 are thereby flattened at the top. Next, the insulating layer 22 is formed over the magnetic pole 20 and the nonmagnetic layer 21.

Figure 12A:
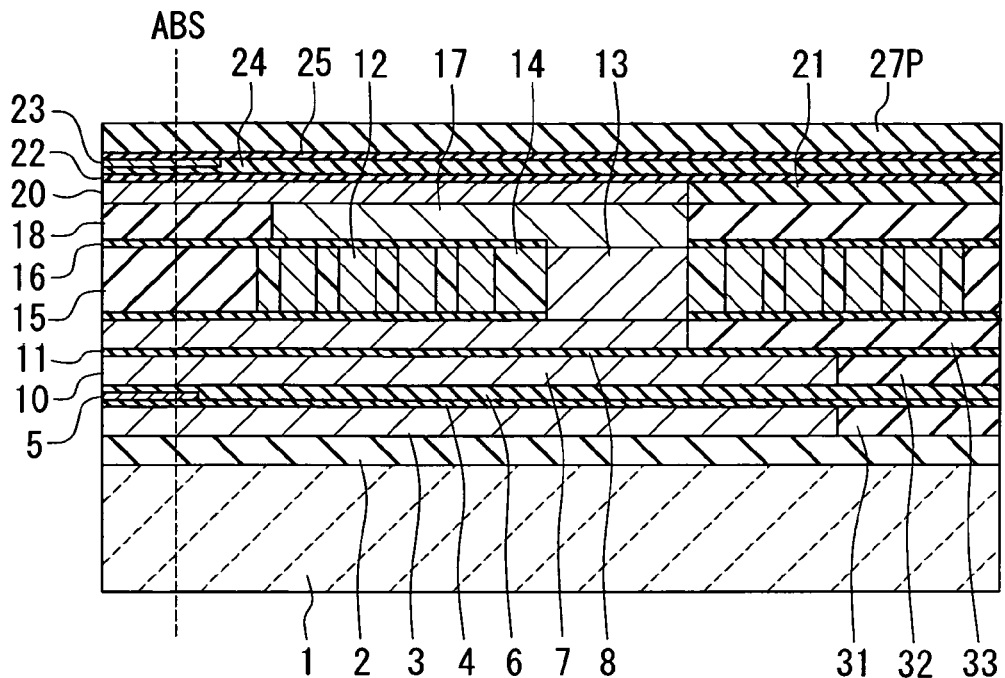
FIG. 12A and FIG. 12B are explanatory diagrams showing a step that follows the step of FIG. 11A and FIG. 11B.
Figure 12B:
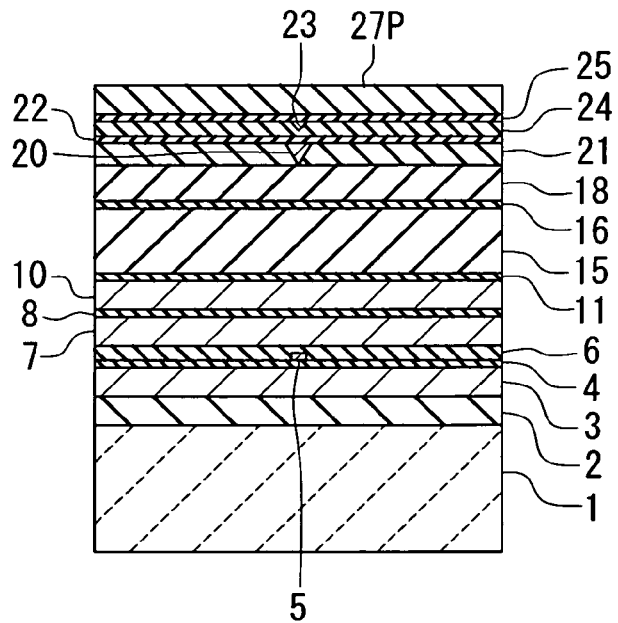

FIG. 12A and FIG. 12B show the next step. In this step, first, a preliminary encasing layer is formed on the insulating layer 22. The preliminary encasing layer is intended to make the encasing layer 24 when the groove 24g is formed therein afterward. Next, the preliminary encasing layer is etched to form the groove 24g therein, whereby the encasing layer 24 is completed. Next, the dielectric film 44 and the near-field light generating element 23 are formed in succession so as to be accommodated in the groove 24g of the encasing layer 24. Note that illustration of the dielectric film 44 is omitted in FIG. 12A and FIG. 12B. Next, the interposition layer 25 is formed over the near-field light generating element 23 and the encasing layer 24. A dielectric layer 27P, which is to make the clad layer 27 afterward, is then formed on the interposition layer 25. The steps of forming the encasing layer 24, the dielectric film 44, the near-field light generating element 23 and the interposition layer 25 will be described later in more detail.

Figure 13A:
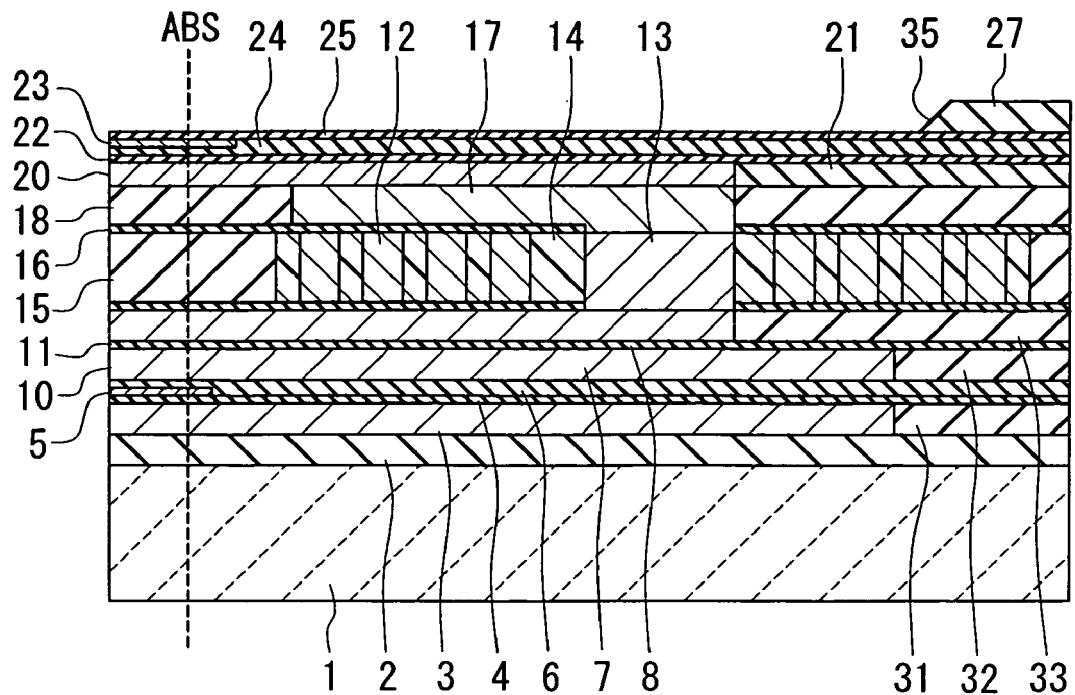
FIG. 13A and FIG. 13B are explanatory diagrams showing a step that follows the step of FIG. 12A and FIG. 12B.
Figure 13B:
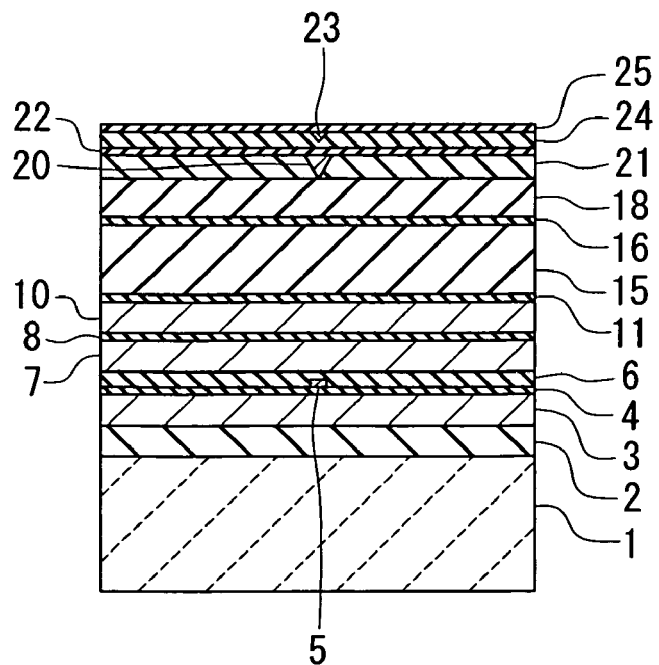

FIG. 13A and FIG. 13B show the next step. In this step, first, a metal mask (not shown) having a plane shape corresponding to that of the clad layer 27 is formed on the dielectric layer 27P. Next, the clad layer 27 is formed by selectively etching the dielectric layer 27P by reactive ion etching (hereinafter referred to as RIE), for example. Here, the dielectric layer 27P is taper-etched so that the clad layer 27 will have an oblique surface for the mirror 35 to be formed thereon afterward. Next, the mirror 35 is formed on the oblique surface of the clad layer 27.

Figure 14A:
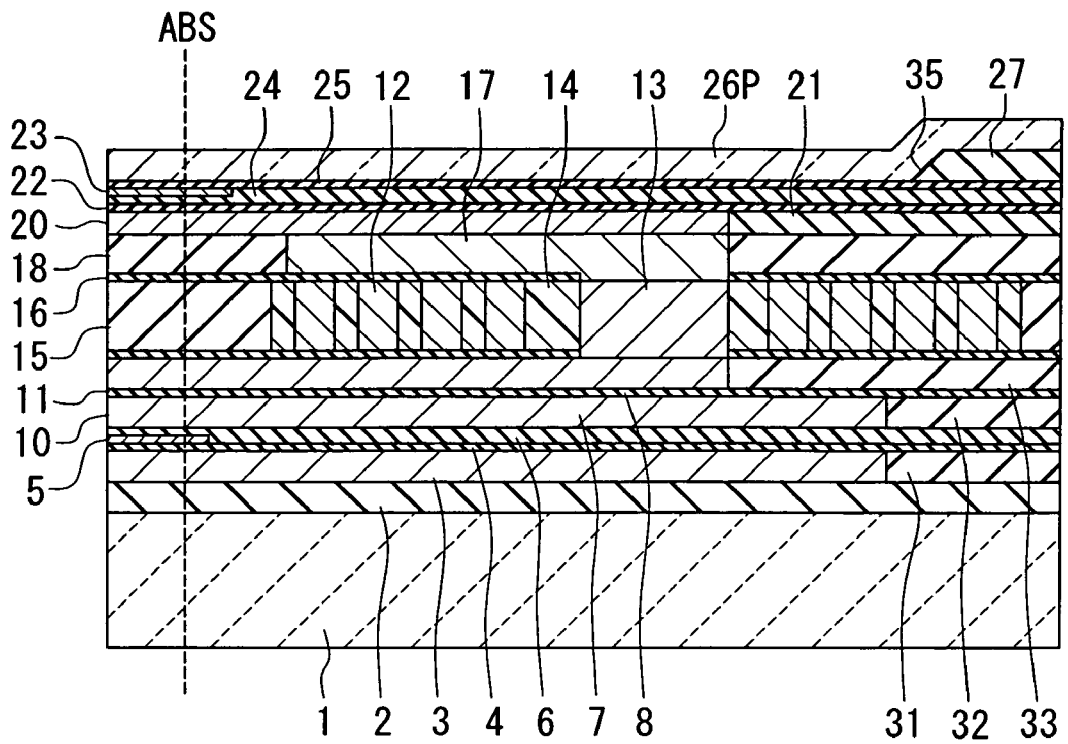
FIG. 14A and FIG. 14B are explanatory diagrams showing a step that follows the step of FIG. 13A and FIG. 13B.
Figure 14B:
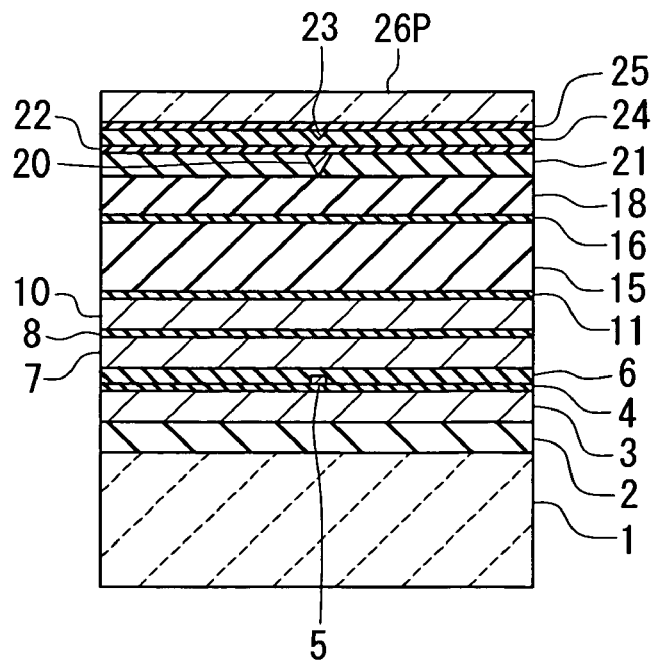

Next, as shown in FIG. 14A and FIG. 14B, a dielectric layer 26P, which is to make the waveguide 26 afterward, is formed over the entire top surface of the stack.

Figure 15A:
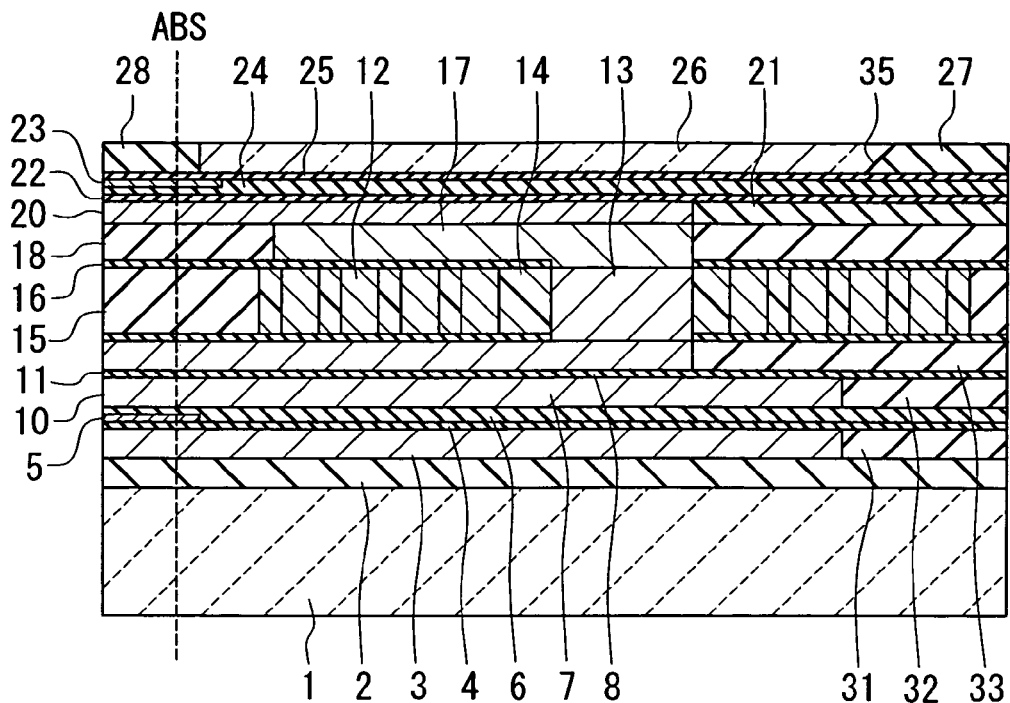
FIG. 15A and FIG. 15B are explanatory diagrams showing a step that follows the step of FIG. 14A and FIG. 14B.
Figure 15B:
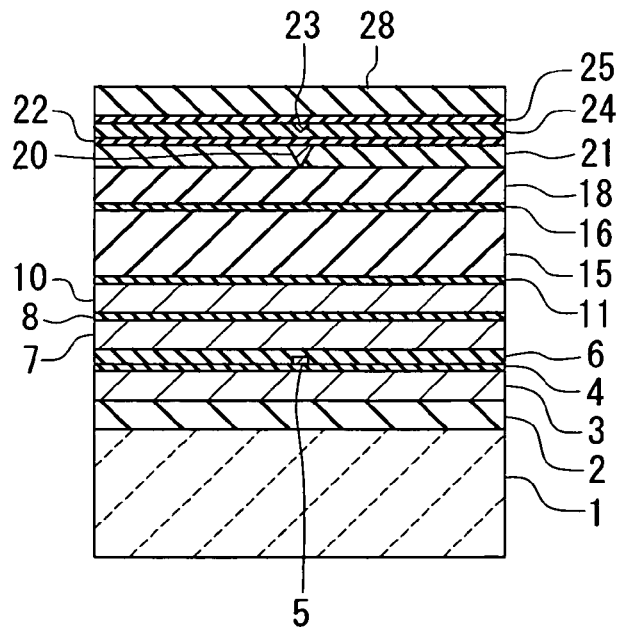

FIG. 15A and FIG. 15B show the next step. In this step, first, the waveguide 26 is formed by selectively etching the dielectric layer 26P by RIE, for example. Next, a dielectric layer to make the clad layer 28 afterward is formed over the entire top surface of the stack. The dielectric layer is then polished by, for example, CMP until the waveguide 26 is exposed. The dielectric layer remaining after the polishing makes the clad layer 28. This polishing also flattens the waveguide 26 and the clad layers 27 and 28 at the top.

Figure 16A:
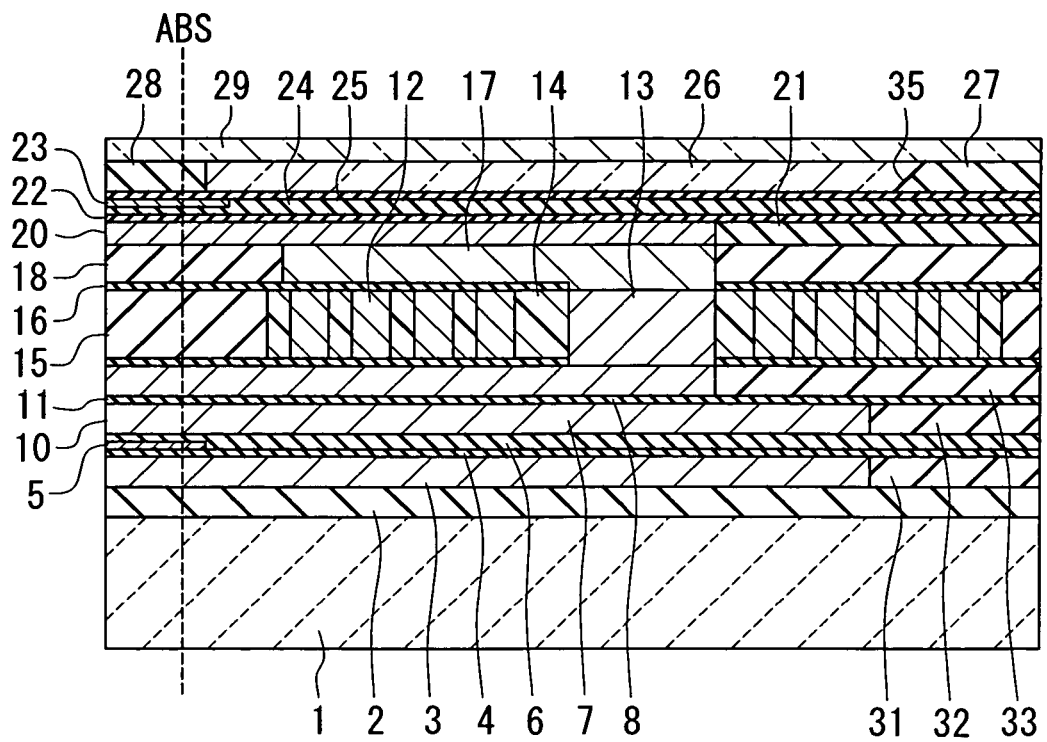
FIG. 16A and FIG. 16B are explanatory diagrams showing a step that follows the step of FIG. 15A and FIG. 15B.
Figure 16B:
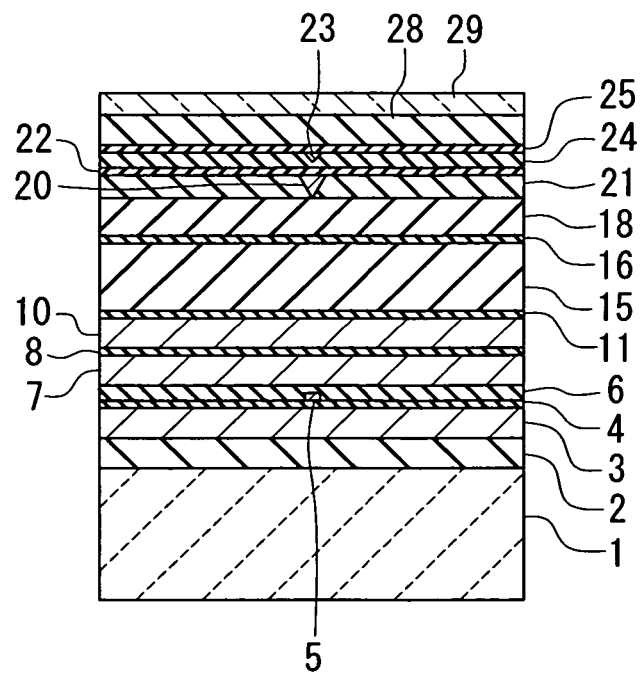
Figure 17A:
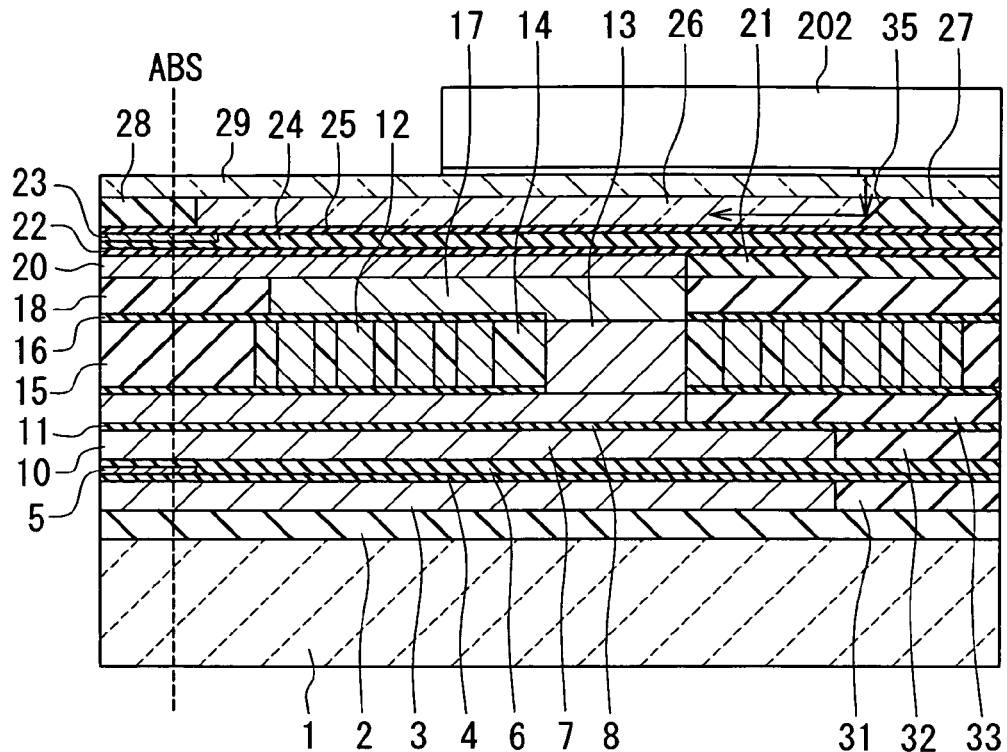
FIG. 17A and FIG. 17B are explanatory diagrams showing a step that follows the step of FIG. 16A and FIG. 16B.
Figure 17B:
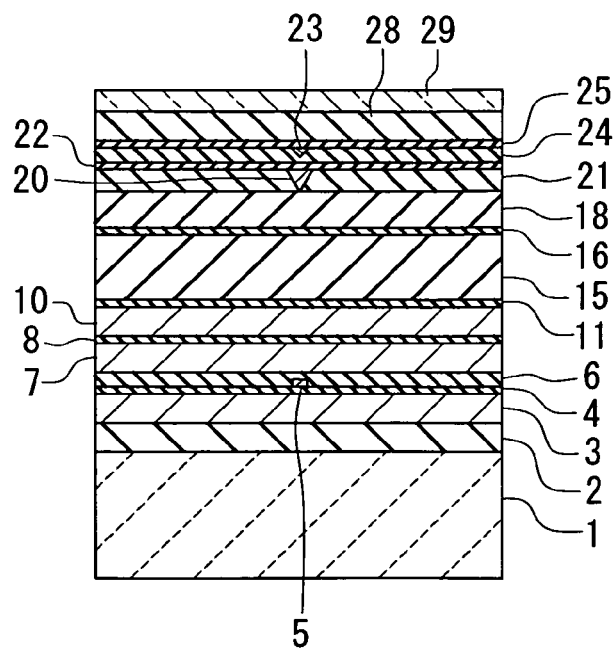

Next, as shown in FIG. 16A and FIG. 16B, the clad layer 29 is formed over the entire top surface of the stack. Next, as shown in FIG. 17A and FIG. 17B, the laser diode 202 is fixed to the top surface of the clad layer 29 with an adhesive, for example.

Next, wiring, terminals and so on are formed on the top surface of the clad layer 29, the substrate is cut into sliders, and polishing of the medium facing surface 30, fabrication of flying rails, etc. are performed to thereby complete the heat-assisted magnetic recording head.

Now, a series of steps for forming the encasing layer 24, the dielectric film 44, the near-field light generating element 23 and the interposition layer 25 will be described in detail with reference to FIG. 18 to FIG. 23. FIG. 18 to FIG. 23 each show a cross section of part of the stack of layers formed in the process of manufacturing the heat-assisted magnetic recording head, the cross section being taken at the position ABS where the medium facing surface 30 is to be formed. Note that the portions closer to the substrate 1 than the insulating layer 24 are omitted in FIG. 18 to FIG. 23.

Figure 18:
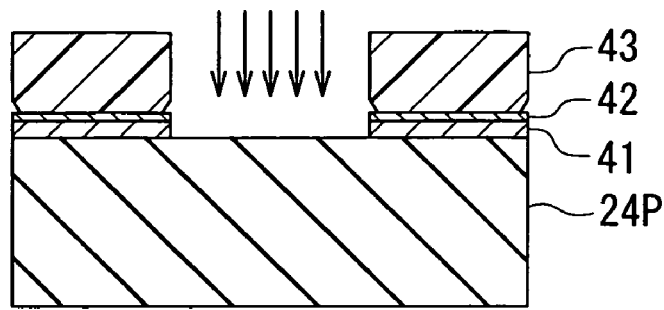
FIG. 18 is a cross-sectional view showing a step in a series of steps for forming an encasing layer, a dielectric film, the near-field light generating element and an interposition layer of the first embodiment of the invention.

FIG. 18 shows the step after the preliminary encasing layer 24P, which is to make the encasing layer 24 when the groove 24g is formed therein afterward, is formed on the insulating layer 22 shown in FIG. 11A and FIG. 11B. In this step, first and second metal layers are initially formed in succession on the preliminary encasing layer 24P. The first metal layer is formed of Ru with a thickness of 50 nm, for example. The second metal layer is formed of NiCr with a thickness of 5 to 10 nm, for example. Next, a photoresist mask 43 is formed on the second metal layer. The photoresist mask 43 has an opening having a plane shape corresponding to that of the near-field light generating element 23. Next, the first and second metal layers except the respective portions lying under the photoresist mask 43 are removed by ion beam etching, for example. The remaining first metal layer makes a first mask layer 41. The remaining second metal layer makes a second mask layer 42. Each of the mask layers 41 and 42 has an opening having a plane shape corresponding to that of the near-field light generating element 23.

Figure 19:
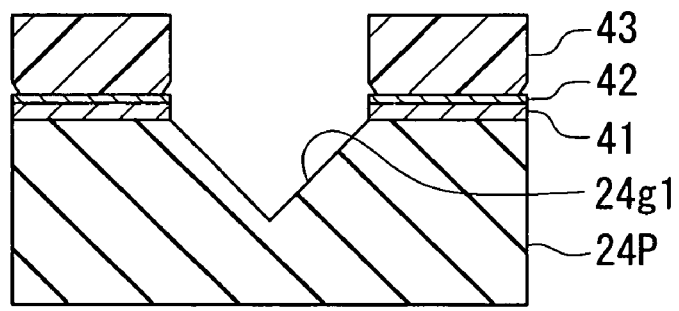
FIG. 19 is a cross-sectional view showing a step that follows the step of FIG. 18.

FIG. 19 shows the next step. In this step, the preliminary encasing layer 24P is taper-etched by, for example, RIE in the area where it is exposed from the openings of the mask layers 41 and 42 and the photoresist mask 43. This forms an initial groove 24g1 in the preliminary encasing layer 24P. The initial groove 24g1 has a V shape in a cross section parallel to the medium facing surface 30. When RIE is employed to taper-etch the preliminary encasing layer 24P, an etching gas containing $Cl_2$, $BCl_3$ and $N_2$ is used, for example. $Cl_2$ and $BCl_3$ are the primary components that contribute to the etching of the preliminary encasing layer 24P. $N_2$ is a gas intended for forming, during the etching of the preliminary encasing layer 24P, a sidewall-protecting film on the sidewalls of the groove to be formed by the etching. The formation of the sidewall-protecting film on the sidewalls of the groove during the etching of the preliminary encasing layer 24P enables the taper-etching of the preliminary encasing layer 24P.

Figure 20:
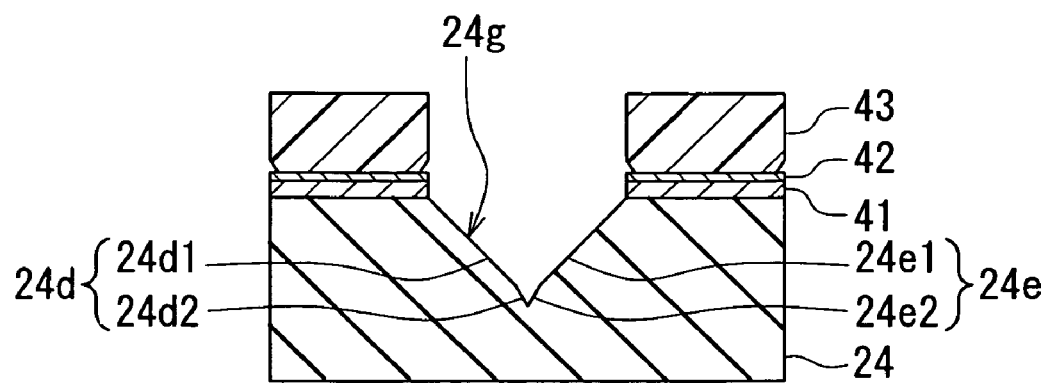
FIG. 20 is a cross-sectional view showing a step that follows the step of FIG. 19.

FIG. 20 shows the next step. In this step, the initial groove 24g1 is further etched by, for example, RIE to complete the groove 24g. The etching in this step is preferably performed under such a condition that the angle formed by each sidewall of the groove with respect to the vertical direction (hereinafter, referred to as the angle of inclination) is smaller than that in the etching performed for forming the initial groove 24g1 shown in FIG. 19. When RIE is employed to etch the initial groove 24g1, the etching is further continued under the condition that the etching proceeds without interruption from the step shown in FIG. 19. The etching condition here may be the same as that employed to form the initial groove 24g1. In this step, the etching proceeds mostly in the vicinity of the bottom of the initial groove 24g1 because the vicinity of the bottom is smaller in dimensions and therefore insufficient in formation of the side-wall protecting film. In consequence, as shown in FIG. 20, there are formed the first sidewall 24d that includes the upper part 24d1 and the lower part 24d2 having an angle of inclination smaller than that of the upper part 24d1, and the second sidewall 24e that includes the upper part 24e1 and the lower part 24e2 having an angle of inclination smaller than that of the upper part 24e1.

Figure 21:
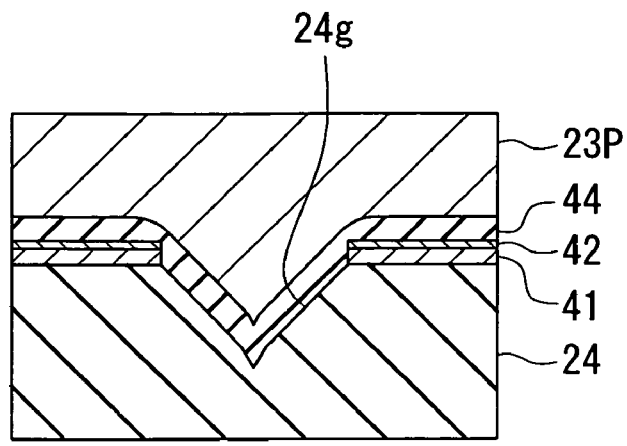
FIG. 21 is a cross-sectional view showing a step that follows the step of FIG. 20.

FIG. 21 shows the next step. In this step, first, the dielectric film 44 is formed over the entire top surface of the stack by, for example, atomic layer deposition (ALD) in which deposition of a single atomic layer is repeated. A part of the dielectric film 44 is formed in the groove 24g. The dielectric film 44 has a thickness of 50 to 200 nm, for example. The dielectric film 44 is formed of alumina, for example. Next, a metal film 23P, which is to make the near-field light generating element 23 afterward, is formed on the dielectric film 44 by sputtering, for example. A part of the metal film 23P is formed in the groove 24g.

Figure 22:
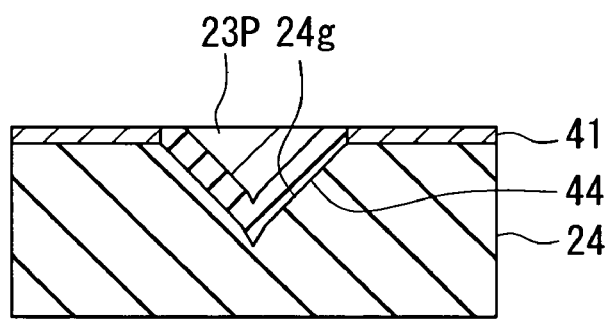
FIG. 22 is a cross-sectional view showing a step that follows the step of FIG. 21.

FIG. 22 shows the next step. In this step, the metal film 23P and the second mask layer 42 are polished by, for example, CMP until the first mask layer 41 is exposed, whereby the first mask layer 41, the dielectric film 44 and the metal film 23P are flattened at the top. In this polishing process, the first mask layer 41 functions as a polishing stopper for stopping the polishing.

Figure 23:
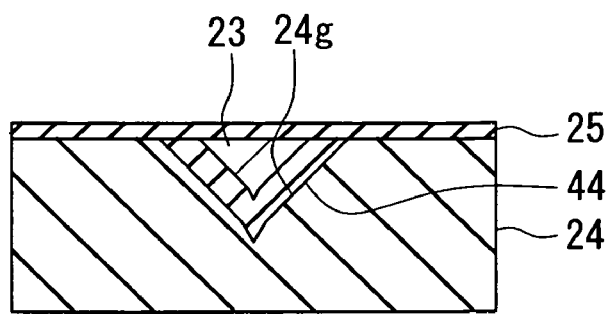
FIG. 23 is a cross-sectional view showing a step that follows the step of FIG. 22.

FIG. 23 shows the next step. In this step, first, a part of the metal film 23P, a part of the dielectric film 44, and the first mask layer 41 are etched by, for example, ion beam etching until the top surface of the encasing layer 24 is exposed, whereby the metal film 23P, the dielectric film 44 and the encasing layer 24 are flattened at the top. The metal film 23P thereby becomes the near-field light generating element 23. Next, the interposition layer 25 is formed over the near-field light generating element 23, the dielectric film 44 and the encasing layer 24 by sputtering, for example.

As has been described, in the heat-assisted magnetic recording head according to the present embodiment, the opposed portion 26g of the outer surface of the waveguide 26 is opposed to a part of the top surface 23c of the near-field light generating element 23 with the interposition layer 25 interposed therebetween. In the present embodiment, evanescent light occurs from the interposition layer 25 based on the light propagating through the waveguide 26. Based on this evanescent light, surface plasmons are excited on the near-field light generating element 23. The surface plasmons then propagate to the near-field light generating part 23f, and the near-field light generating part 23f generates near-field light based on the surface plasmons. According to the present embodiment, it is possible to increase the efficiency of conversion of the light propagating through the waveguide 26 into the near-field light, as compared with the case where a plasmon antenna is directly irradiated with laser light to produce near-field light.

According to the present embodiment, it is possible to suppress a temperature rise of the near-field light generating element 23 because the near-field light generating element 23 is not directly irradiated with the laser light propagating through the waveguide 26. In the present embodiment, the length $H_{PA}$ of the near-field light generating element 23 in the direction perpendicular to the medium facing surface 30 is greater than the length $T_{PA}$ of the first end face 23a in the direction perpendicular to the top surface 1a of the substrate 1. Thus, the near-field light generating element 23 according to the present embodiment is greater in volume than a conventional plasmon antenna in which the length in the direction perpendicular to the medium facing surface 30 is smaller than the length in the direction perpendicular to the top surface 1a of the substrate 1. This also contributes to suppression of a temperature rise of the near-field light generating element 23. Consequently, according to the present embodiment, it is possible to prevent the near-field light generating element 23 from expanding and protruding from the medium facing surface 30 due to a temperature increase of the near-field light generating element 23.

In the present embodiment, the near-field light generating element 23 is accommodated in the groove 24g of the encasing layer 24. The groove 24g has the first sidewall 24d and the second sidewall 24e that decrease in distance from each other with increasing distance from the top surface 24c of the encasing layer 24. The near-field light generating element 23 has an outer surface that includes the first end face 23a located in the medium facing surface 30, the second end face 23b farther from the medium facing surface 30, and the coupling portion that couples the first end face 23a and the second end face 23b to each other. The coupling portion includes the top surface 23c, the first side surface 23d that is opposed to the first sidewall 24d, and the second side surface 23e that is opposed to the second sidewall 24e. The distance between the first side surface 23d and the second side surface 23e decreases with increasing distance from the top surface 23c. The first end face 23a includes the first side 123d that is located at the end of the first side surface 23d, the second side 123e that is located at the end of the second side surface 23e, the third side 123c that is located at the end of the top surface 23c, and the pointed tip 123f that is formed by contact of the first side 123d and the second side 123e with each other and constitutes the near-field light generating part 23f.

The first side surface 23d includes the upper part 23d1 and the lower part 23d2 that are continuous with each other. The second side surface 23e includes the upper part 23e1 and the lower part 23e2 that are continuous with each other. The first side 123d includes the upper part 123d1 and the lower part 123d2 that are continuous with each other. The second side 123e includes the upper part 123e1 and the lower part 123e2 that are continuous with each other. The angle θ4 that is formed between the lower part 23d2 of the first side surface 23d and the lower part 23e2 of the second side surface 23e, and that is formed between the lower part 123d2 of the first side 123d and the lower part 123e2 of the second side 123e, is smaller than the angle θ3 that is formed between the upper part 23d1 of the first side surface 23d and the upper part 23e1 of the second side surface 23e, and that is formed between the upper part 123d1 of the first side 123d and the upper part 123e1 of the second side 123e. This makes it possible to form the pointed tip 123f and its vicinity constituting the near-field light generating part 23f into a fine and sharply pointed shape in the end face 23a of the near-field light generating element 23.

According to the present embodiment, the near-field light generating element 23 having the foregoing shape allows a lot of surface plasmons to concentrate at the near-field light generating part 23f of pointed shape. The present embodiment thus makes it possible to generate near-field light that has a small spot diameter and sufficient intensity.

In the present embodiment, the first sidewall 24d of the groove 24g includes the upper part 24d1 and the lower part 24d2 that are continuous with each other. The second sidewall 24e of the groove 24g includes the upper part 24e1 and the lower part 24e2 that are continuous with each other. The first sidewall 24d includes the first edge 124d that lies in the end face 24a. The second sidewall 24e includes the second edge 124e that lies in the end face 24a. The first edge 124d includes the upper part 124d1 and the lower part 124d2 that are continuous with each other. The second edge 124e includes the upper part 124e1 and the lower part 124e2 that are continuous with each other. The angle θ2 that is formed between the lower part 24d2 of the first sidewall 24d and the lower part 24e2 of the second sidewall 24e, and that is formed between the lower part 124d2 of the first edge 124d and the lower part 124e2 of the second edge 124e, is smaller than the angle θ1 that is formed between the upper part 24d1 of the first sidewall 24d and the upper part 24e1 of the second sidewall 24e, and that is formed between the upper part 124d1 of the first edge 124d and the upper part 124e1 of the second edge 124e. The near-field light generating element 23 having the end face 23a of previously-described shape is obtainable by forming the near-field light generating element 23 so as to be accommodated in the groove 24g of such a shape.

In the present embodiment, the dielectric film 44 is interposed between the near-field light generating element 23 and the wall faces of the groove 24g. Consequently, in the end face 23a of the near-field light generating element 23, the vicinity of the pointed tip 123f formed by the lower part 123d2 of the first side 123d and the lower part 123e2 of the second side 123e can be made smaller as compared with the case where the dielectric film 44 is not provided. This makes it possible to reduce the spot diameter of the near-field light to be generated by the near-field light generating part 23f. In the heat-assisted magnetic recording head according to the present embodiment, the near-field light generating element 23 and the waveguide 26 are disposed farther from the top surface 1a of the substrate 1 than is the magnetic pole 20, and the light emitted from the laser diode 202 disposed above the waveguide 26 is reflected by the mirror 35 so as to travel through the waveguide 26 toward the medium facing surface 30.

A case will now be considered where a near-field light generating element and a waveguide are disposed closer to the top surface 1a of the surface 1 than is the magnetic pole 20, i.e., in a positional relationship reverse to that of the near-field light generating element 23 and the waveguide 26 with the magnetic pole 20 according to the present embodiment. In this case, since the magnetic pole 20 lies above the near-field light generating element and the waveguide, the optical path from the laser diode to the waveguide becomes longer and the energy loss of the light increases if the laser diode is disposed above the waveguide as in the present embodiment. The longer optical path from the laser diode to the waveguide also makes it harder to precisely position the laser diode and the waveguide, thus often resulting in energy loss of the light due to misalignment between the laser diode and the waveguide.

In contrast, the present embodiment allows shortening the optical path from the laser diode 202 to the waveguide 26, thus making it possible to guide the light from the laser diode 202 to the opposed portion 26g of the outer surface of the waveguide 26 through a shorter path. According to the present embodiment, it is therefore possible to reduce the energy loss of the light. Furthermore, the present embodiment allows the laser diode 202 and the waveguide 26 to be put close to each other, which facilitates precise positioning of the laser diode 202 and the waveguide 26. Consequently, according to the present embodiment, it is possible to reduce the energy loss of the light resulting from misalignment between the laser diode 202 and the waveguide 26.

In the present embodiment, the clad layer 29 having a refractive index lower than that of the waveguide 26 is disposed between the emission part 202a of the laser diode 202 and the waveguide 26. Light that is incident on the interface between the waveguide 26 and the clad layer 29 from the side of the waveguide 26 at incident angles greater than or equal to the critical angle is thus totally reflected at the interface. This can prevent the laser light that is emitted from the laser diode 202 to pass through the clad layer 29 and enter the waveguide 26 from passing through the clad layer 29 again to return to the laser diode 202. Consequently, according to the present embodiment, it is possible to increase the use efficiency of the laser light and to prevent the laser diode 202 from being damaged by laser light that returns to the laser diode 202.

From the foregoing, the present embodiment makes it possible to increase the use efficiency of the light used for generating near-field light in the heat-assisted magnetic recording head.

MODIFICATION EXAMPLE

Figure 24:
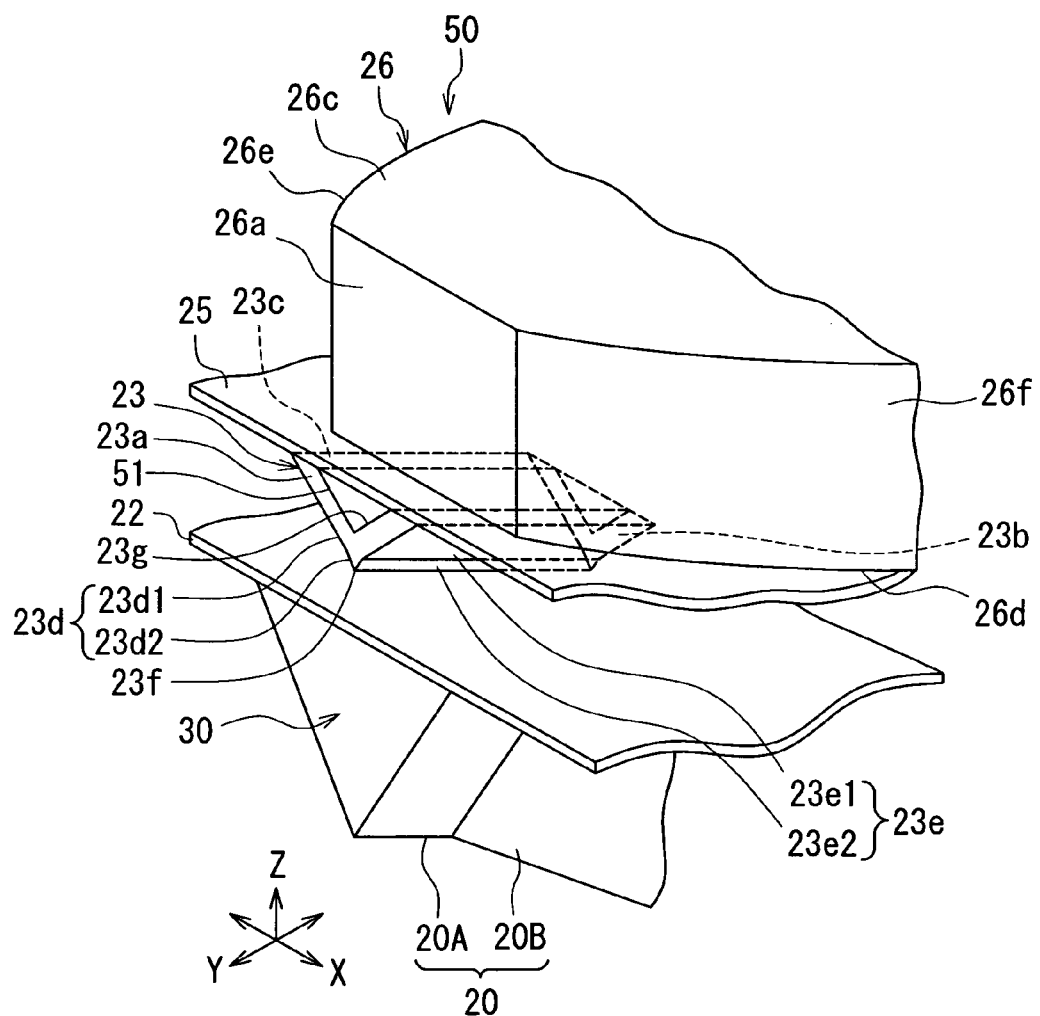
FIG. 24 is a perspective view showing a near-field light generating element and its vicinity in a heat-assisted magnetic recording head according to a modification example of the first embodiment of the invention.

A modification example of the present embodiment will be now described. FIG. 24 is a perspective view showing the near-field light generating element 23 and its vicinity in a heat-assisted magnetic recording head according to the modification example of the present embodiment. In this modification example, the near-field light generating element 23 has a groove 23g that opens in the top surface 23c. The groove 23g is V-shaped in a cross section parallel to the medium facing surface 30. Accordingly, the first and second end faces 23a and 23b of the near-field light generating element 23 are generally V-shaped. The heat-assisted magnetic recording head of the modification example further has a dielectric layer 51 disposed in the groove 23g. The dielectric layer 51 is made of the same material as that of the waveguide 26, for example. The near-field light generating element 23, the dielectric layer 51 and the encasing layer 24 are flattened at the top. The interposition layer 25 is disposed over the top surfaces of the near-field light generating element 23, the dielectric layer 51 and the encasing layer 24.

In the near-field light generating element 23 shown in FIG. 1, the top surface 23c has two edges that extend in the direction perpendicular to the medium facing surface 30 and where surface plasmons concentrate. On the other hand, in the near-field light generating element 23 of the modification example, the top surface 23c has four edges that extend in the direction perpendicular to the medium facing surface 30 and where surface plasmons concentrate. According to the modification example, the top surface 23c of the near-field light generating element 23 thus has a greater number of edges that extend in the direction perpendicular to the medium facing surface 30 and where surface plasmons concentrate. This makes it possible to concentrate surface plasmons with high efficiency to let them propagate to the near-field light generating part 23f.

Second Embodiment

Figure 25:
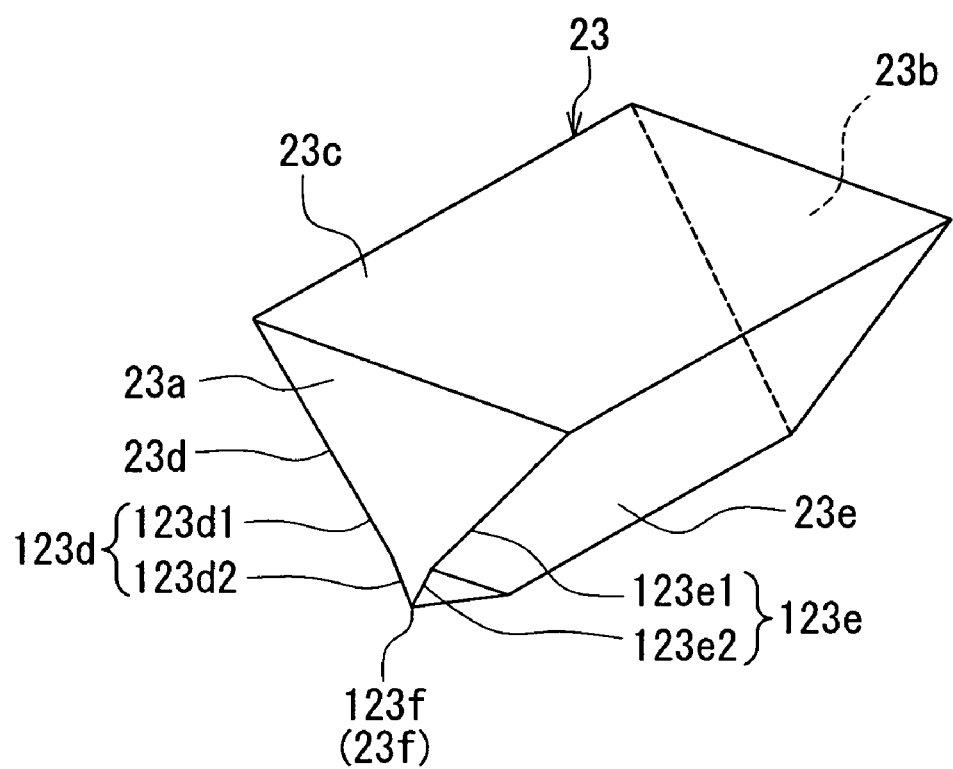
FIG. 25 is a perspective view of a near-field light generating element of a second embodiment of the invention.

A second embodiment of the present invention will now be described with reference to FIG. 25. FIG. 25 is a perspective view of the near-field light generating element according to the present embodiment. The near-field light generating element 23 according to the present embodiment is configured so that an area near the first end face 23a (hereinafter, referred to as front end vicinity area) has a bottom end that gets farther from the top surface 1a of the substrate 1 with decreasing distance to the first end face 23a. Only in the front end vicinity area of the near-field light generating element 23, each of the side surfaces 23d and 23e includes an upper part and a lower part that are continuous with each other, and the angle formed between the lower part of the side surface 23d and the lower part of the side surface 23e is smaller than that formed between the upper part of the side surface 23d and the upper part of the side surface 23e. In the area other than the front end vicinity area of the near-field light generating element 23, the side surfaces 23d and 23e are each planar or almost planar in shape. The shape of the first end face 23a is the same as in the first embodiment.

The sidewalls 24d and 24e of the groove 24g in the encasing layer 24 of the present embodiment have a shape corresponding to the side surfaces 23d and 23e of the near-field light generating element 23. The groove 24g of such a shape can be formed in the following way. In the present embodiment, the mask layers 41 and 42 are formed in the step shown in FIG. 18. The photoresist mask 43 is then removed and a new photoresist mask is formed on the mask layer 42. The new photoresist mask has an opening wider than that of each of the mask layers 41 and 42. Note that the opening of the new photoresist mask has a smaller width in the track width direction in an area near the position ABS where the medium facing surface 30 is to be formed than in the other area. Subsequently, in the step shown in FIG. 19, the preliminary encasing layer 24P is taper-etched to form the initial groove 24g1. Here, the etching gas will not be sufficiently supplied to the area of the initial groove 24g1 near the position ABS where the medium facing surface 30 is to be formed, since the opening of the foregoing new photoresist mask has a smaller width in that area. Consequently, the near-ABS area of the initial groove 24g1 becomes shallower and suffers insufficient formation of the side-wall protecting film, as compared with the other area of the initial groove 24g1. When such an initial groove 24g1 is further etched in the step shown in FIG. 20, the etching mostly proceeds in the vicinity of the bottom in the near-ABS area of the initial groove 24g1 where the sidewall-protecting film is insufficiently formed. As a result, there are formed the sidewalls 24d and 24e that have a shape corresponding to the side surfaces 23d and 23e of the near-field light generating element 23 shown in FIG. 25.

The remainder of configuration, function and effects of the present embodiment are similar to those of the first embodiment.

Third Embodiment

Figure 26:
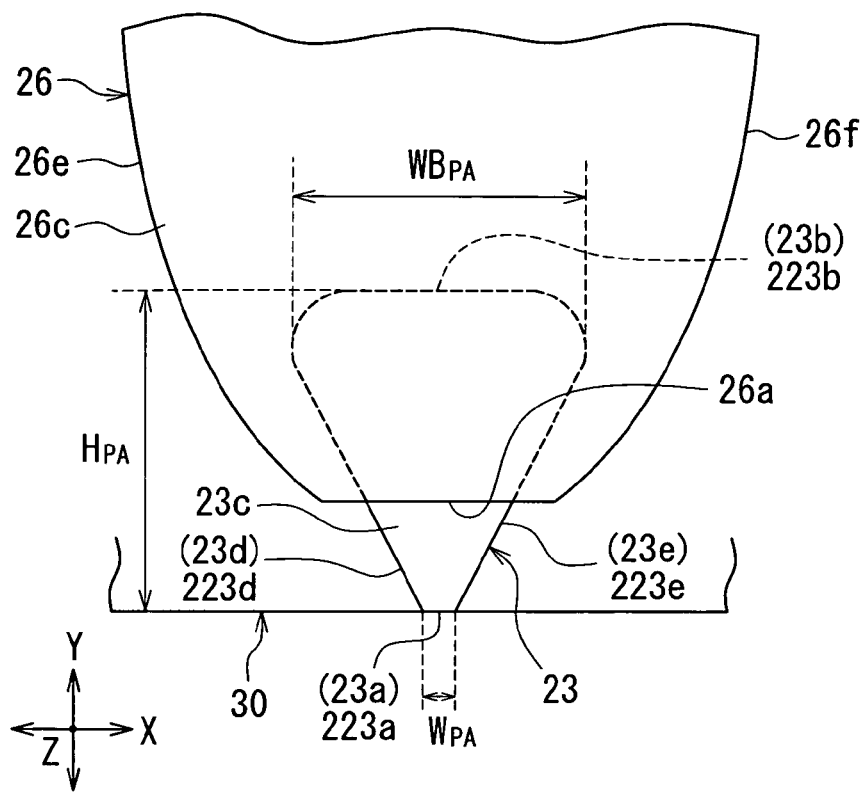
FIG. 26 is a plan view showing a part of a waveguide and a near-field light generating element of a heat-assisted magnetic recording head according to a third embodiment of the invention.
Figure 27:
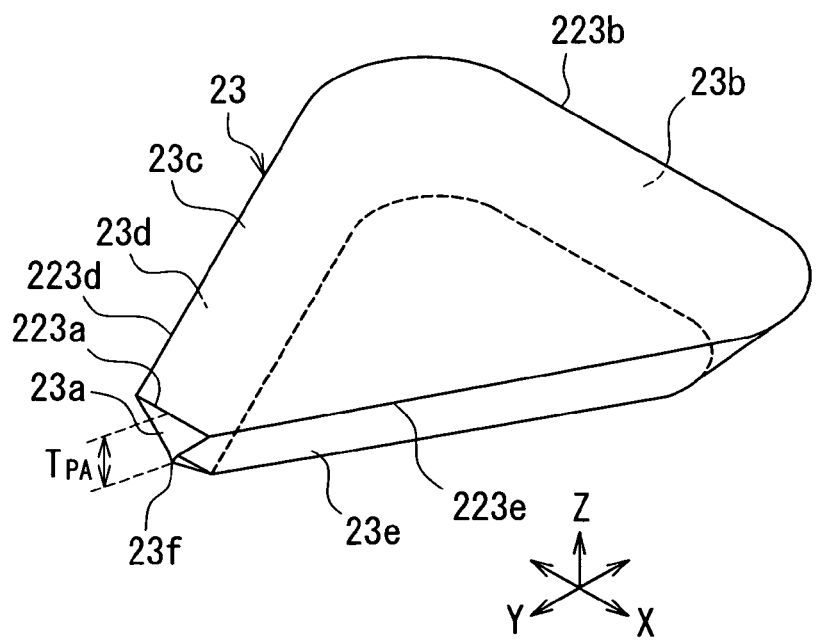
FIG. 27 is a perspective view of the near-field light generating element of FIG. 26.

A third embodiment of the present invention will now be described with reference to FIG. 26 and FIG. 27. FIG. 26 is a plan view showing a part of the waveguide 26 and the near-field light generating element 23 of the present embodiment. FIG. 27 is a perspective view of the near-field light generating element 23 shown in FIG. 26.

In the near-field light generating element 23 of the present embodiment, the side surfaces 23d and 23e have their respective portions that decrease in distance from each other in the track width direction with decreasing distance to the medium facing surface 30. The corner portion between the side surface 23d and the second end face 23b and the corner portion between the side surface 23e and the second end face 23b are both rounded. In the present embodiment, in particular, the side surfaces 23d and 23e excluding the above-mentioned two corner portions decrease in distance from each other in the track width direction with decreasing distance to the medium facing surface 30.

The top surface 23c has a first border 223a that is located at the top end of the first end face 23a, a second border 223b that is located at the top end of the second end face 23b, a third border 223d that is located at the top end of the first side surface 23d, and a fourth border 223e that is located at the top end of the second side surface 23e. The third border 223d and the fourth border 223e have their respective portions that decrease in distance from each other in a direction parallel to the first border 223a with decreasing distance to the first border 223a. The corner portion between the second border 223b and the third border 223d and the corner portion between the second border 223b and the fourth border 223e are both rounded. In the present embodiment, in particular, the third border 223d and the fourth border 223e excluding the above-mentioned two corner portions decrease in distance from each other in the direction parallel to the first border 223a with decreasing distance to the first border 223a.

A part of the bottom surface 26d of the waveguide 26 is opposed to a part of the top surface 23c of the near-field light generating element 23 with the interposition layer 25 interposed therebetween. FIG. 26 shows an example in which the front end face 26a of the waveguide 26 is located away from the medium facing surface 30. However, the front end face 26a may be located in the medium facing surface 30.

As shown in FIG. 27, the near-field light generating element 23 according to the present embodiment is configured so that an area near the first end face 23a (hereinafter, referred to as front end vicinity area) has a bottom end that gets farther from the top surface 1a of the substrate 1 with decreasing distance to the first end face 23a. Only in the front end vicinity area of the near-field light generating element 23, each of the side surfaces 23d and 23e includes an upper part and a lower part that are continuous with each other, and the angle formed between the lower part of the side surface 23d and the lower part of the side surface 23e is smaller than that formed between the upper part of the side surface 23d and the upper part of the side surface 23e. In the area other then front end vicinity area of the near-field light generating element 23, the side surfaces 23d and 23e are each planar or almost planar in shape. The shape of the first end face 23a is the same as in the first embodiment.

The sidewalls 24d and 24e of the groove 24g in the encasing layer 24 of the present embodiment have a shape corresponding to the side surfaces 23d and 23e of the near-field light generating element 23. The groove 24g of such a shape can be formed in the following way. In the present embodiment, the preliminary encasing layer 24P is taper-etched to form the initial groove 24g1 in the step shown in FIG. 19. Here, the etching gas will not be sufficiently supplied to the area of the initial groove 24g1 near the position ABS where the medium facing surface is to be formed, since the groove width is small in that area. Consequently, the near-ABS area of the initial groove 24g1 becomes shallower and suffers insufficient formation of the side-wall protecting film, as compared with the other area of the initial groove 24g1. When such an initial groove 24g1 is further etched in the step shown in FIG. 20, the etching mostly proceeds in the vicinity of the bottom in the near-ABS area of the initial groove 24g1 where the sidewall-protecting film is insufficiently formed. As a result, there are formed the sidewalls 24d and 24e that have a shape corresponding to the side surfaces 23d and 23e of the near-field light generating element 23 shown in FIG. 27.

As shown in FIG. 26, the length of the near-field light generating element 23 in the direction perpendicular to the medium facing surface 30 will be designated by the symbol $H_{P4}$; the width of the first end face 23a at its top end will be designated by the symbol $W_{P4}$; and the maximum width of the near-field light generating element 23 in the track width direction (the X direction) will be designated by the symbol $WB_{P4}$. As shown in FIG. 27, the length of the first end face 23a in the direction perpendicular to the top surface 1a of the substrate 1 will be designated by the symbol $T_{P4}$. The length $H_{P4}$ of the near-field light generating element 23 in the direction perpendicular to the medium facing surface 30 is greater than the length $T_{P4}$ of the first end face 23a in the direction perpendicular to the top surface 1a of the substrate 1. $W_{P4}$ falls within the range of 50 to 350 nm, for example. $T_{P4}$ falls within the range of 60 to 350 nm, for example. $H_{P4}$ falls within the range of 0.25 to 2.5 μm, for example. $WB_{P4}$ falls within the range of 0.25 to 2.5 μm, for example.

The present embodiment allows an increase in area of the opposed portion of the waveguide 26 opposed to a part of the top surface 23c of the near-field light generating element 23. Consequently, it is possible to excite more surface plasmons on the top surface 23c of the near-field light generating element 23. According to the present embodiment, in the top surface 23c of the near-field light generating element 23, the corner portion between the second border 223b and the third border 223d and the corner portion between the second border 223b and the fourth border 223e are both rounded. This can prevent near-field light from occurring from these corner portions. In the present embodiment, the top surface 23c of the near-field light generating element 23 is configured so that the third border 223d and the fourth border 223e of the top surface 23c of the near-field light generating element 23, excluding the foregoing two corner portions, decrease in distance from each other in the direction parallel to the first border 223a with decreasing distance to the first border 223a. This configuration can concentrate surface plasmons excited on the top surface 23c while the surface plasmons propagate to the first end face 23a. According to the present embodiment, it is therefore possible to concentrate more surface plasmons at the near-field light generating part 23f of pointed shape.

The remainder of configuration, function and effects of the present embodiment are similar to those of the second embodiment.

Fourth Embodiment

Figure 28:
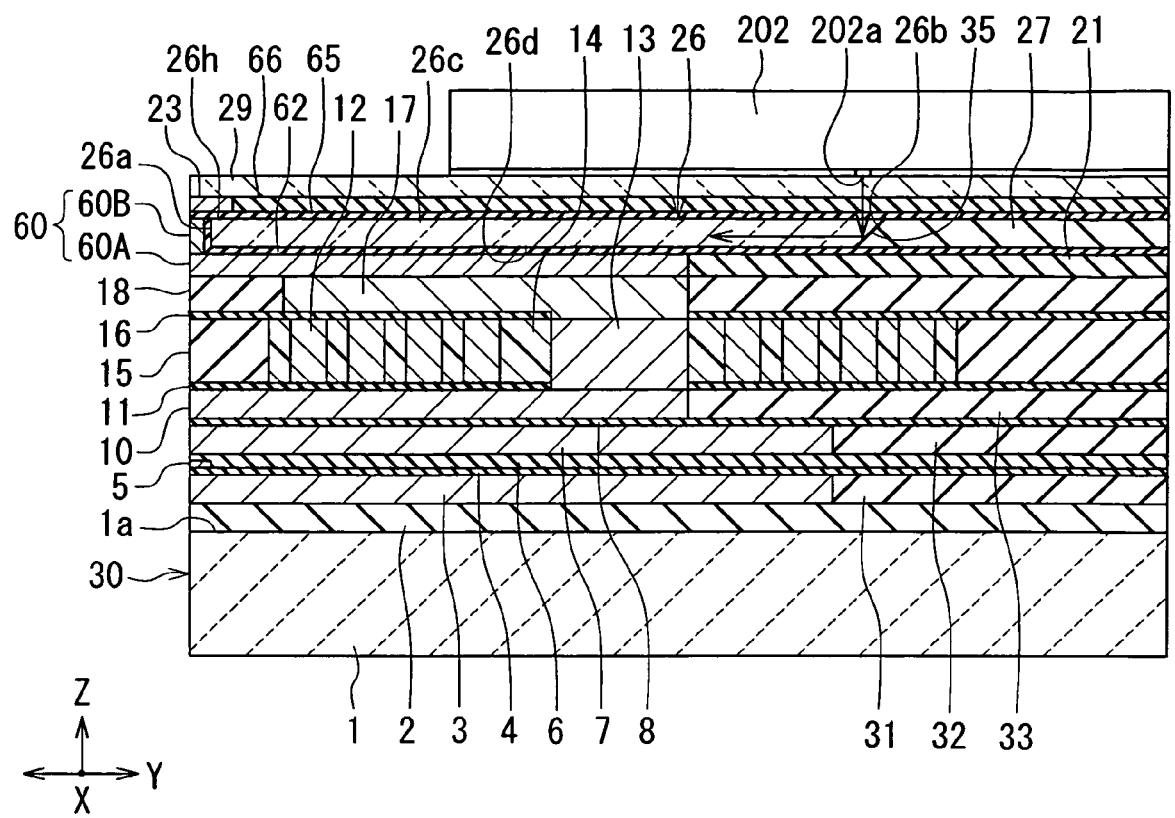
FIG. 28 is a cross-sectional view showing the configuration of a heat-assisted magnetic recording head according to a fourth embodiment of the invention.

A heat-assisted magnetic recording head according to a fourth embodiment of the present invention will now be described with reference to FIG. 28. FIG. 28 is a cross-sectional view showing the configuration of the heat-assisted magnetic recording head according to the present embodiment. FIG. 28 shows a cross section perpendicular to the medium facing surface and the top surface of the substrate.

The heat-assisted magnetic recording head according to the present embodiment has a magnetic pole 60 instead of the magnetic pole 20 of the first embodiment. The magnetic pole 60 includes a first layer 60A and a second layer 60B. The first layer 60A and the second layer 60B are made of the same material as that of the magnetic pole 20 of the first embodiment. The first layer 60A lies over the bottom yoke layer 17 and the nonmagnetic layer 18. The first layer 60A has an end face located in the medium facing surface 30. This end face has a rectangular shape, for example.

The nonmagnetic layer 21 is disposed around the first layer 60A on the nonmagnetic layer 18. The second layer 60B lies on the first layer 60A near the medium facing surface 30. The second layer 60B has a front end face located in the medium facing surface 30, and a rear end face opposite to the front end face. The front end face of the second layer 60B has a rectangular shape, for example.

The position of the end of a bit pattern to be recorded on the recording medium depends on the position of the top end, i.e., the end farther from the top surface 1a of the substrate 1, of the front end face of the second layer 60B. The width of the front end face of the second layer 60B at its top end defines the track width.

The width of the end face of the first layer 60A located in the medium facing surface 30 may be equal to or greater than the width of the front end face of the second layer 60B.

The heat-assisted magnetic recording head according to the present embodiment has a clad layer 62 instead of the insulating layer 22, the encasing layer 24 and the interposition layer 25 of the first embodiment. The clad layer 62 is disposed to cover the top surfaces of the first layer 60A and the non-magnetic layer 21 around the second layer 60B, and the rear end face of the second layer 60B. The clad layer 62 is made of a dielectric material having a refractive index lower than that of the waveguide 26.

In the present embodiment, the waveguide 26, the clad layer 27 and the mirror 35 are disposed on the clad layer 62. The front end face 26a of the waveguide 26 is opposed to the rear end face of the second layer 60B with the clad layer 62 interposed therebetween. The second layer 60B, the clad layer 62, the waveguide 26 and the clad layer 27 are flattened at the top.

The heat-assisted magnetic recording head according to the present embodiment further has an interposition layer 65 disposed over the top surfaces of the second layer 60B, the clad layer 62, the waveguide 26 and the clad layer 27. The material and thickness of the interposition layer 65 are the same as those of the interposition layer 25 of the first embodiment.

In the present embodiment, the near-field light generating element 23 is disposed on the interposition layer 65. The shape of the near-field light generating element 23 may be any of the ones shown in FIG. 1, FIG. 24, FIG. 25 and FIG. 27. The heat-assisted magnetic recording head according to the present embodiment further has a clad layer 66 disposed around the near-field light generating element 23 on the interposition layer 65. The near-field light generating element 23 and the clad layer 66 are flattened at the top. The clad layer 66 is made of a dielectric material that has a refractive index lower than that of the waveguide 26 and transmits laser light.

In the present embodiment, the clad layer 29 is disposed over the top surfaces of the near-field light generating element 23 and the clad layer 66. As in the first embodiment, the laser diode 202 is fixed to the top surface of the clad layer 29 with an adhesive, for example.

For example, if the waveguide 26 is made of $Ta_2O_5$ which has a refractive index of approximately 2.1, the clad layers 27, 29, 62 and 66 and the interposition layer 65 may be made of alumina which has a refractive index of approximately 1.8.

In the present embodiment, the waveguide 26 is disposed closer to the top surface 1a of the substrate 1 than is the near-field light generating element 23. The outer surface of the waveguide 26 includes an opposed portion 26h that is opposed to a part of the coupling portion of the outer surface of the near-field light generating element 23. In the present embodiment, in particular, a part of the top surface 26c of the waveguide 26 is opposed to a part of the bottom end of the near-field light generating element 23 with the interposition layer 65 interposed therebetween. This part of the top surface 26c of the waveguide 26 opposed to the part of the above-mentioned bottom end is the opposed portion 26h.

In the present embodiment, laser light emitted from the emission part 202a of the laser diode 202 passes through the clad layers 29 and 66 and the interposition layer 65, enters the waveguide 26 from the top surface 26c and reaches the rear end face 26b, where the laser light is reflected by the mirror 35 so as to travel through the waveguide 26 toward the medium facing surface 30 (the front end face 26a). This laser light propagates through the waveguide 26 to reach the vicinity of the opposed portion 26h. The laser light is then totally reflected at the interface between the opposed portion 26h and the interposition layer 65, and this generates evanescent light permeating into the interposition layer 65. As a result, the evanescent light and the collective oscillations of charges at the bottom end of the near-field light generating element 23, i.e., surface plasmons, are coupled with each other to excite a system of surface plasmon polaritons. In this way, surface plasmons are excited on the near-field light generating element 23.

The surface plasmons excited on the near-field light generating element 23 propagate along the bottom end of the near-field light generating element 23 toward the near-field light generating part 23f. Consequently, the surface plasmons concentrate at the near-field light generating part 23f, and near field light thus occurs from the near-field light generating part 23f based on the surface plasmons.

The remainder of configuration, function and effects of the present embodiment are similar to those of the first to third embodiments.

The present invention is not limited to the foregoing embodiments but can be carried out in various modifications. For example, the near-field light generating element 23 may have a shape other than the shapes shown in FIG. 1, FIG. 24, FIG. 25 and FIG. 27.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A near-field light generating device comprising:

an encasing layer having a top surface and a groove that opens in the top surface; and a near-field light generating element that is accommodated in the groove and has a near-field light generating part, a surface plasmon being excited based on light and propagating to the near-field light generating part, the near-field light generating part generating near-field light based on the surface plasmon, wherein:

the groove has a first sidewall and a second sidewall that decrease in distance from each other with increasing distance from the top surface of the encasing layer;

the near-field light generating element has an outer surface, the outer surface including: a first end face that includes the near-field light generating part; a second end face opposite to the first end face; and a coupling portion that couples the first end face and the second end face to each other;

a length of the near-field light generating element in a direction perpendicular to the first end face is greater than a length of the first end face in a direction perpendicular to the top surface of the encasing layer;

the coupling portion includes a top surface, a first side surface that is opposed to the first sidewall, and a second side surface that is opposed to the second sidewall, a distance between the first side surface and the second side surface decreasing with increasing distance from the top surface of the coupling portion;

the first end face includes: a first side that is located at an end of the first side surface; a second side that is located at an end of the second side surface; a third side that is located at an end of the top surface of the coupling portion; and a pointed tip that is formed by contact of the first and second sides with each other and constitutes the near-field light generating part;

each of the first side and the second side includes an upper part and a lower part that are continuous with each other; and an angle formed between the lower part of the first side and the lower part of the second side is smaller than that formed between the upper part of the first side and the upper part of the second side.

2. The near-field light generating device according to claim 1, wherein:

the encasing layer has an end face that is located in the same plane as the first end face;

the first sidewall includes a first edge that lies in the end face;

the second sidewall includes a second edge that lies in the end face;

each of the first edge and the second edge includes an upper part and a lower part that are continuous with each other; and an angle formed between the lower part of the first edge and the lower part of the second edge is smaller than that formed between the upper part of the first edge and the upper part of the second edge.

3. The near-field light generating device according to claim 1, further comprising a dielectric film that is disposed between the first and second sidewalls and the first and second side surfaces.

4. The near-field light generating device according to claim 1, further comprising a waveguide that allows propagation of light to be used for exciting a surface plasmon on the near-field light generating element, the waveguide having an outer surface that includes an opposed portion opposed to a part of the coupling portion.

5. The near-field light generating device according to claim 4, further comprising an interposition layer that has a refractive index lower than that of the waveguide and is interposed between the opposed portion and the near-field light generating element.

6. The near-field light generating device according to claim 4, wherein:

the top surface of the coupling portion has a first border that is located at a top end of the first end face, a second border that is located at a top end of the second end face, a third border that is located at a top end of the first side surface, and a fourth border that is located at a top end of the second side surface;

the third border and the fourth border have their respective portions that decrease in distance from each other in a direction parallel to the first border with decreasing distance to the first border; and a corner portion between the second border and the third border and a corner portion between the second border and the fourth border are both rounded.

7. A method of manufacturing a near-field light generating device, the near-field light generating device comprising:

an encasing layer having a top surface and a groove that opens in the top surface; and a near-field light generating element that is accommodated in the groove and has a near-field light generating part, a surface plasmon being excited based on light and propagating to the near-field light generating part, the near-field light generating part generating near-field light based on the surface plasmon, wherein:

the groove has a first sidewall and a second sidewall that decrease in distance from each other with increasing distance from the top surface of the encasing layer;

the near-field light generating element has an outer surface, the outer surface including: a first end face that includes the near-field light generating part; a second end face opposite to the first end face; and a coupling portion that couples the first end face and the second end face to each other;

a length of the near-field light generating element in a direction perpendicular to the first end face is greater than a length of the first end face in a direction perpendicular to the top surface of the encasing layer;

the coupling portion includes a top surface, a first side surface that is opposed to the first sidewall, and a second side surface that is opposed to the second sidewall, a distance between the first side surface and the second side surface decreasing with increasing distance from the top surface of the coupling portion;

the first end face includes: a first side that is located at an end of the first side surface; a second side that is located at an end of the second side surface; a third side that is located at an end of the top surface of the coupling portion; and a pointed tip that is formed by contact of the first and second sides with each other and constitutes the near-field light generating part;

each of the first side and the second side includes an upper part and a lower part that are continuous with each other; and an angle formed between the lower part of the first side and the lower part of the second side is smaller than that formed between the upper part of the first side and the upper part of the second side, the method comprising the steps of:

forming a preliminary encasing layer that is intended to make the encasing layer when the groove is formed therein afterward;

completing the encasing layer by forming the groove in the preliminary encasing layer by etching the preliminary encasing layer; and forming the near-field light generating element such that it is accommodated in the groove of the encasing layer.

8. The method of manufacturing a near-field light generating device according to claim 7, wherein:

the encasing layer has an end face that is located in the same plane as the first end face;

the first sidewall includes a first edge that lies in the end face;

the second sidewall includes a second edge that lies in the end face;

each of the first edge and the second edge includes an upper part and a lower part that are continuous with each other;

an angle formed between the lower part of the first edge and the lower part of the second edge is smaller than that formed between the upper part of the first edge and the upper part of the second edge; and the step of completing the encasing layer includes the steps of:

forming an initial groove in the preliminary encasing layer by taper-etching the preliminary encasing layer; and completing the groove by etching the initial groove.

9. The method of manufacturing a near-field light generating device according to claim 7, wherein:

the near-field light generating device further comprises a dielectric film that is disposed between the first and second sidewalls and the first and second side surfaces; and the method further comprises the step of forming the dielectric film that is performed between the step of completing the encasing layer and the step of forming the near-field light generating element.

10. A heat-assisted magnetic recording head comprising:
a medium facing surface that faces a recording medium;
a magnetic pole that has an end face located in the medium facing surface, for producing a recording magnetic field for recording data on the recording medium; and
the near-field light generating device according to claim 4, wherein:
the near-field light generating part is located in the medium facing surface; and
the near-field light generating device generates near-field light that is to be applied to the recording medium when data is recorded on the recording medium using the recording magnetic field.

11. The heat-assisted magnetic recording head according to claim 10, further comprising a substrate on which the magnetic pole and the near-field light generating device are stacked, wherein:
the substrate has a top surface that faces the magnetic pole and the near-field light generating device; and
the near-field light generating device is located farther from the top surface of the substrate than is the magnetic pole.

12. A near-field light generating device comprising:
an encasing layer having a top surface and a groove that opens in the top surface; and
a near-field light generating element that is accommodated in the groove and has a near-field light generating part, a surface plasmon being excited based on light and propagating to the near-field light generating part, the near-field light generating part generating near-field light based on the surface plasmon, wherein:
the groove has a first sidewall and a second sidewall that decrease in distance from each other with increasing distance from the top surface of the encasing layer;
the near-field light generating element has an outer surface, the outer surface including: a first end face that includes the near-field light generating part; a second end face opposite to the first end face; and a coupling portion that couples the first end face and the second end face to each other;
a length of the near-field light generating element in a direction perpendicular to the first end face is greater than a length of the first end face in a direction perpendicular to the top surface of the encasing layer;
the coupling portion includes a top surface, a first side surface that is opposed to the first sidewall, and a second side surface that is opposed to the second sidewall, a distance between the first side surface and the second side surface decreasing with increasing distance from the top surface of the coupling portion;
the first end face includes: a first side that is located at an end of the first side surface; a second side that is located at an end of the second side surface; a third side that is located at an end of the top surface of the coupling portion; and a pointed tip that is formed by contact of the first and second sides with each other and constitutes the near-field light generating part;
the top surface of the coupling portion has a first border that is located at a top end of the first end face, a second border that is located at a top end of the second end face, a third border that is located at a top end of the first side surface, and a fourth border that is located at a top end of the second side surface;
the third border and the fourth border have their respective portions that decrease in distance from each other in a direction parallel to the first border with decreasing distance to the first border; and
a corner portion between the second border and the third border and a corner portion between the second border and the fourth border are both rounded.

13. The near-field light generating device according to claim 12, further comprising a waveguide that allows propagation of light to be used for exciting a surface plasmon on the near-field light generating element, the waveguide having an outer surface that includes an opposed portion opposed to a part of the coupling portion.

14. The near-field light generating device according to claim 13, further comprising an interposition layer that has a refractive index lower than that of the waveguide and is interposed between the opposed portion and the near-field light generating element.

15. A heat-assisted magnetic recording head comprising:
a medium facing surface that faces a recording medium;
a magnetic pole that has an end face located in the medium facing surface, for producing a recording magnetic field for recording data on the recording medium; and
the near-field light generating device according to claim 13, wherein:
the near-field light generating part is located in the medium facing surface; and
the near-field light generating device generates near-field light that is to be applied to the recording medium when data is recorded on the recording medium using the recording magnetic field.

16. The heat-assisted magnetic recording head according to claim 15, further comprising a substrate on which the magnetic pole and the near-field light generating device are stacked, wherein:
the substrate has a top surface that faces the magnetic pole and the near-field light generating device; and
the near-field light generating device is located farther from the top surface of the substrate than is the magnetic pole.

* * * * *